United States Patent
McIntyre et al.

(10) Patent No.: US 6,169,673 B1
(45) Date of Patent: Jan. 2, 2001

(54) SWITCHED CAPACITOR CIRCUIT HAVING VOLTAGE MANAGEMENT AND METHOD

(75) Inventors: William James McIntyre, Wheatland; Jeffrey P. Kotowski, Nevada City, both of CA (US)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/238,372

(22) Filed: Jan. 27, 1999

(51) Int. Cl.$^7$ .................................................. H02M 3/18
(52) U.S. Cl. ............................................ 363/59; 363/60
(58) Field of Search .......................... 363/59, 60, 62; 307/109, 110; 327/325, 536

(56) References Cited

U.S. PATENT DOCUMENTS

| | | | |
|---|---|---|---|
| 4,451,743 | 5/1984 | Suzuki et al. | 307/110 |
| 4,636,930 | 1/1987 | Bingham et al. | 363/60 |
| 4,679,134 | 7/1987 | Bingham et al. | 363/61 |
| 4,777,577 | 10/1988 | Bingham et al. | 363/60 |
| 4,797,899 | 1/1989 | Fuller et al. | 375/7 |
| 4,809,152 | 2/1989 | Bingham et al. | 363/61 |
| 4,897,774 | 1/1990 | Bingham et al. | 363/61 |
| 5,237,209 | 8/1993 | Brewer | 307/110 |
| 5,581,454 | * 12/1996 | Collins | 363/59 |
| 5,680,300 | 10/1997 | Szepesi et al. | 363/59 |
| 5,684,487 | * 11/1997 | Timko | 341/172 |
| 5,982,450 | * 11/1999 | Nakamura | 348/554 |

OTHER PUBLICATIONS

Data Sheet for Maxim MAX619 DC–DC Converter, Feb. 1994.
Data Sheet for Linear Technology LTC1516 DC/DC Converter, Jul. 1996.

* cited by examiner

*Primary Examiner*—Matthew Nguyen
(74) *Attorney, Agent, or Firm*—Limbach & Limbach L.L.P.

(57) ABSTRACT

A switched capacitor circuit, for use in voltage converters and the like, which includes a switched capacitor array, a plurality of MOS transistor switches and drive circuitry for controlling the state of the switches. The drive circuitry alternates between a first phase where at least one capacitor of the array is connected by the switches between an input node and an output node and a second phase where the capacitor is connected in series between one of the output and input nodes and a third node, such as a circuit common. Boost and buck gain configurations are achieved when connected to the output and input nodes, respectively. A voltage management feature is implemented to control voltages produced in the array so that no PN junction of the transistor switches formed by a body and the drain/source regions disposed in the body becomes forward biased.

77 Claims, 9 Drawing Sheets

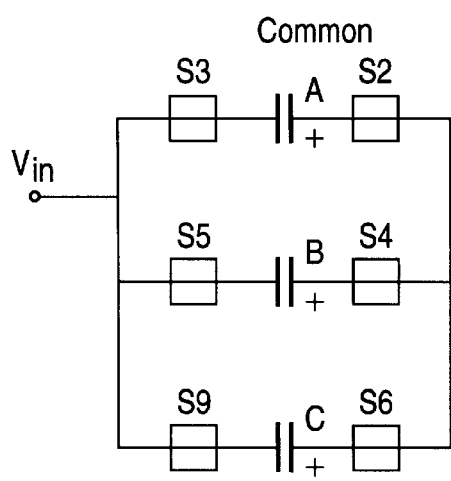
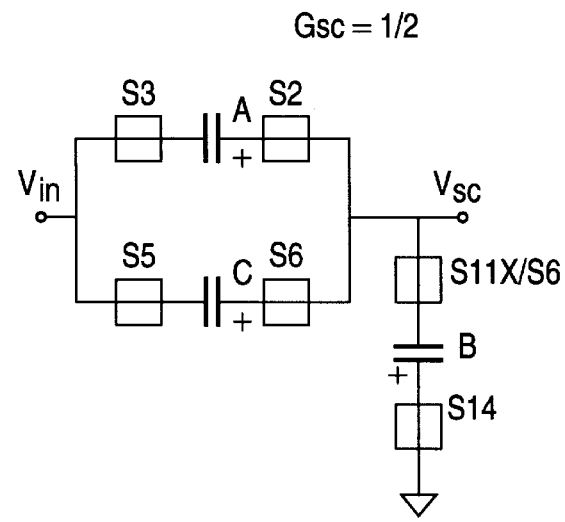
FIG. 3A                FIG. 3B
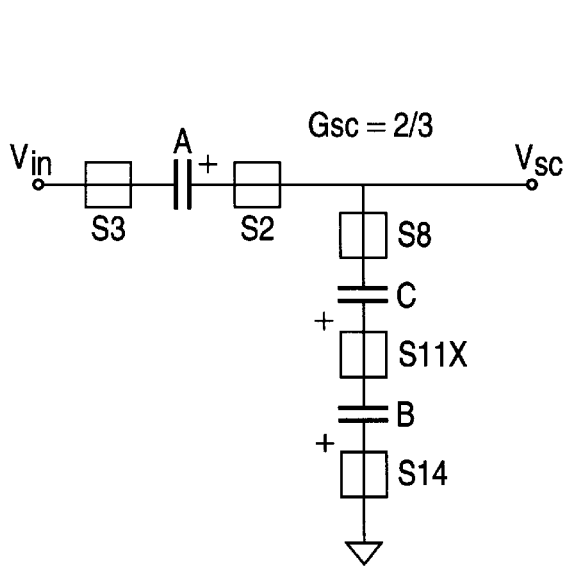
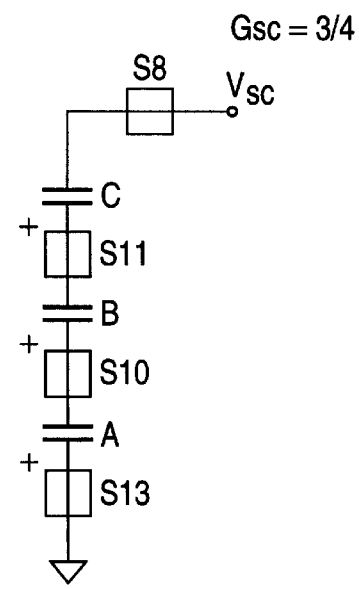
FIG. 3C                FIG. 3D

| SWITCH STATES (0 = off; 1 = on; P = common; S = gain) | | | | | | | |
|---|---|---|---|---|---|---|---|
| SWITCHES | GAIN CONFIGURATION (Gsc) | | | | | | |
|  | 1/2 | 2/3 | 3/4 | 1 | 4/3 | 3/2 | 2 |
| S1 | 0 | 0 | 0 | S | S⁻ | S | 0 |
| S2 | 1 | P | P | P | P⁻ | P⁻ | P⁻ |
| S3 | P⁻ | 1 | P⁻ | P | P | P | 1 |
| S4 | P | P | P | 1 | P⁻ | P⁻ | P⁻ |
| S5 | P⁻ | P⁻ | P⁻ | 1 | P | P | P |
| S6 | 1 | P | P | P | P⁻ | 1 | P⁻ |
| S7 | 0 | 0 | 0 | S | 0 | 0 | S |
| S8 | 0 | S⁻ | S⁻ | S⁻ | 0 | 0 | 0 |
| S9 | P⁻ | P⁻ | P⁻ | P | P | P | P |
| S10 | 0 | 0 | S⁻ | S⁻ | S | S⁻ | S |
| S11 | 0 | 0 | 0 | 0 | S⁻ | 0 | 0 |
| S11x | S | S | S | 0 | S⁻ | 0 | 0 |
| S12 | 0 | 0 | 0 | 0 | S⁻ | 0 | S⁻ |
| S13 | 0 | 0 | S⁻ | 0 | 0 | 0 | 0 |
| S14 | S⁻ | S⁻ | 0 | 0 | 0 | 0 | 0 |
| S15 | 0 | 0 | 0 | 0 | 0 | S⁻ | S⁻ |

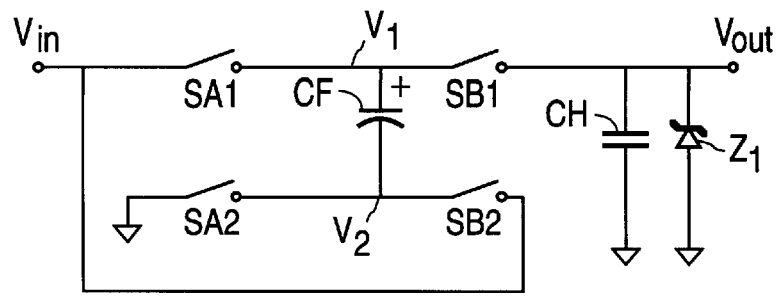
FIG. 6
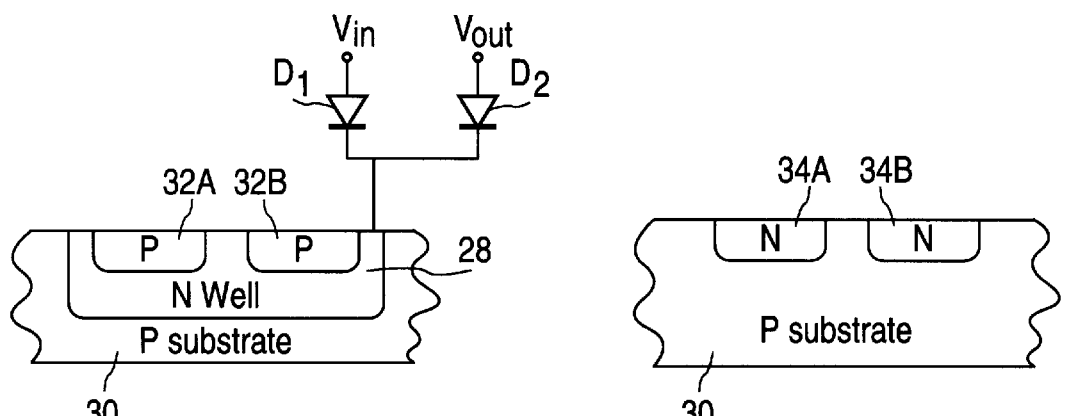
FIG. 7A          FIG. 7B
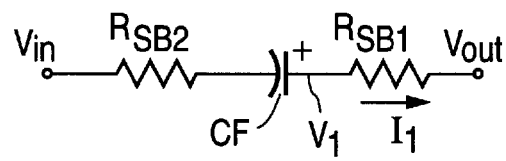
FIG. 8A
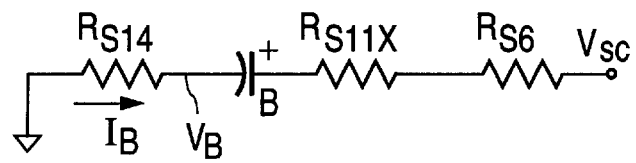
FIG. 8B

| SWITCH PATH RESISTANCES ||
|---|---|
| S1 | 1Ω |
| S2 | 2/3Ω |
| S3 | 2Ω |
| S4 | 2/3Ω |
| S5 | 2Ω |
| S6 | 2/3Ω |
| S7 | 1Ω |
| S8 | 1Ω |
| S9 | 2Ω |
| S10 | 1Ω |
| S11 | 1Ω |
| S11X | 10Ω |
| S12 | 1/2Ω |
| S13 | 1/2Ω |
| S14 | 1/2Ω |
| S15 | 1Ω |
FIG. 11
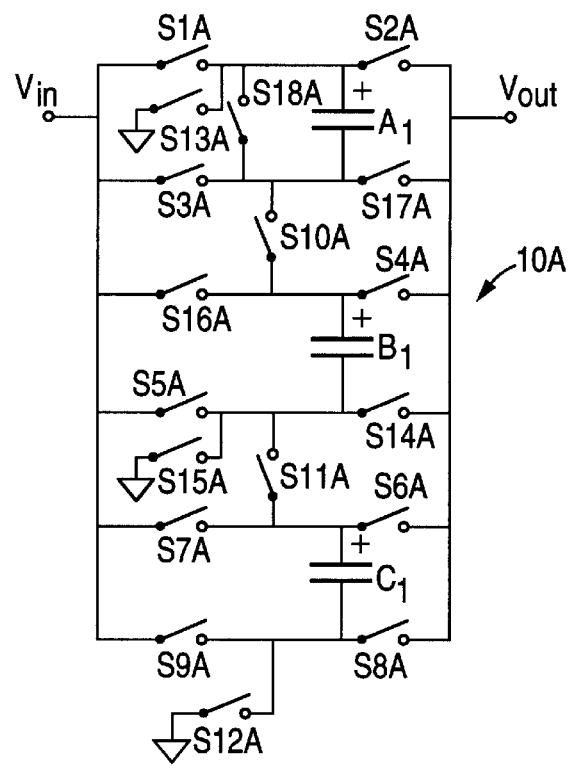
FIG. 12
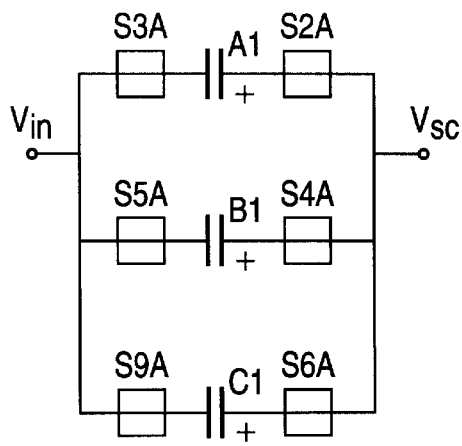
FIG. 13A
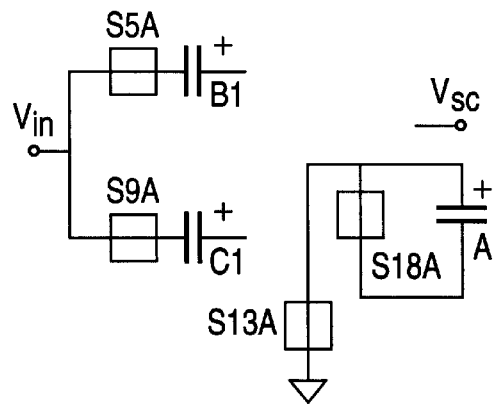
FIG. 13B

| | SWITCH STATES (0 = off; 1 = on; P = common; S = gain) | | | | | | | |
|---|---|---|---|---|---|---|---|---|
| SWITCHES | GAIN CONFIGURATION (Gsc) | | | | | | | |
| | 1/2 | 2/3 | 3/4 | 1 | 4/3 | 3/2 | 2 | 1' |
| S1A | 0 | 0 | 0 | S | S⁻ | S | 0 | 0 |
| S2A | P | P | P | P⁻ | P⁻ | P⁻ | P⁻ | P |
| S3A | P⁻ | P⁻ | P⁻ | P | P | P | 1 | P |
| S4A | 1 | P | P | P⁻ | P⁻ | P⁻ | P⁻ | P |
| S5A | P⁻ | P⁻ | P⁻ | P | P | P | P | 1⁻ |
| S6A | 1 | P | P | P⁻ | P⁻ | 1⁻ | P⁻ | P |
| S7A | 0 | 0 | 0 | S | 0 | 0 | S | 0 |
| S8A | 0 | 0 | S⁻ | S⁻ | 0 | 0 | 0 | 0 |
| S9A | P⁻ | 1⁻ | P⁻ | P | P | P | P | 1⁻ |
| S10A | 0 | S | S⁻ | 0 | S | S⁻ | 0 | 0 |
| S11A | 0 | 0 | S | 0 | S⁻ | 0 | 0 | 0 |
| S12A | 0 | 0 | 0 | 0 | S⁻ | 0 | S⁻ | 0 |
| S13A | S⁻ | S⁻ | S⁻ | 0 | 0 | 0 | 0 | S⁻ |
| S14A | 0 | S⁻ | 0 | S⁻ | 0 | 0 | 0 | 0 |
| S15A | 0 | 0 | 0 | 0 | 0 | S⁻ | S⁻ | 0 |
| S16A | 0 | 0 | 0 | S | 0 | 0 | S | 0 |
| S17A | S | 0 | 0 | S⁻ | 0 | 0 | 0 | 0 |
| S18A | 0 | 0 | 0 | 0 | 0 | 0 | 0 | S |
FIG. 14
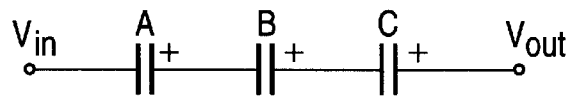
FIG. 16A
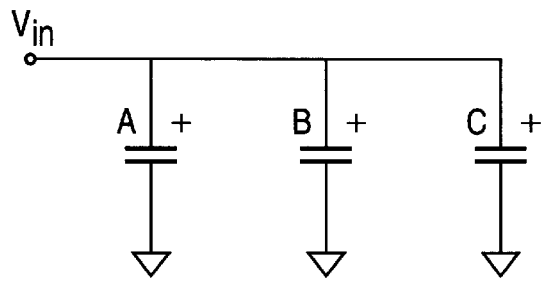
FIG. 16B

| SWITCH PATH RESISTANCES ||
|---|---|
| S1A | 0.6Ω |
| S2A | 0.4Ω |
| S3A | 1.2Ω |
| S4A | 0.5Ω |
| S5A | 1.5Ω |
| S6A | 0.65Ω |
| S7A | 1.1Ω |
| S8A | 0.9Ω |
| S9A | 1.6Ω |
| S10A | 1.0Ω |
| S11A | 0.8Ω |
| S12A | 0.24Ω |
| S13A | 0.12Ω |
| S14A | 0.7Ω |
| S15A | 0.24Ω |
| S16A | 0.7Ω |
| S17A | 0.6Ω |
| S18A | 1.5Ω |

FIG. 17A     FIG. 17B     FIG. 17C

SWITCHED CAPACITOR CIRCUIT HAVING VOLTAGE MANAGEMENT AND METHOD

BACKGROUND OF THE INVENTION

The present invention relates generally to switched capacitor circuitry and in particular to circuitry for managing the magnitude of various voltages present in switched capacitor circuitry in order to improve the performance of such circuitry.

DESCRIPTION OF RELATED ART

Switched capacitor circuitry is used in several applications and is particularly advantageous where the use of inductors is to be avoided. In a typical application, switched capacitor circuitry is used to convert a D.C. input voltage to one or more D.C. output voltages which may differ in magnitude and polarity from the input voltage. In some instances the circuitry includes some form of voltage regulation for controlling the magnitude of the output voltage notwithstanding changes in magnitude of the input voltage and changes in the load driven by the circuitry. An example of such circuitry is disclosed in U.S. Pat. No. 5,680,300.

Switched capacitor circuitry typically includes several switches used for connecting the capacitors of the circuitry in different configurations. The switches may be implemented using either P or N type MOS transistors or a combination of both, depending upon the voltages which appear on the switches during operation. It has been found by the present inventors that in many switched capacitor applications, particularly in D.C. to D.C. converter applications where the output is regulated, the actual voltages which are produced at the transistor switches interfere with proper operation of the switched capacitor array circuitry.

The present invention overcomes the above-noted shortcomings of the prior art switched capacitor circuits. This and other advantages of the present invention will become apparent to those skilled in the art upon a reading of the following Detailed Description of the Invention together with the drawings.

SUMMARY OF THE INVENTION

A switched capacitor circuit, for use in voltage converters and the like, is disclosed. The circuit includes a switched capacitor array, a plurality of MOS transistor switches and drive circuitry for controlling the state of the switches. The drive circuitry alternates between a first phase where at least one capacitor of the array is connected by the switches between an input node and an output node and a second phase where the capacitor is connected in series between one of the output and input nodes and a third node, such as a circuit common. Boost and buck gain configurations are achieved when connected to the output and input nodes, respectively.

Voltage management means is included to control voltages produced in the array so that no PN junction of the transistor switches formed by a body and the drain/source regions disposed in the body becomes forward biased. By way of example, such voltages can be controlled by selecting various resistance ratios, controlling relative timing of switch closures, limiting the maximum gain configurations based upon the magnitude of the output voltage and introducing a third phase intermediate the first and second phases which functions to reverse the polarity of a potentially deleterious charge developed on the capacitor during the first phase.

BRIEF DESCRIPTION OF THE DRAWINGS

FIGS. 3A through 3H depict equivalent circuits achieved by the FIG. 1 switched capacitor array for various gain configurations.

FIGS. 4A through 4D are timing diagrams illustrating the manner in which the timing of switch closures is carried out in the FIG. 1 switched capacitor array.

FIG. 6 is a schematic diagram of a conventional switched capacitor array used to illustrate the operation of certain aspects of the subject invention.

FIGS. 7A and 7B are schematic cross-sections of conventional P type and N type MOS transistors, respectively.

FIGS. 8A and 8B are equivalent circuits showing current flow through selected transistor switches.

FIG. 11 is a table showing the resistance values for the current paths associated with each transistor switch of the first embodiment switched capacitor array.

FIG. 12 is schematic diagram of a second embodiment switched capacitor array.

FIGS. 13A and 13B are schematic diagrams of equivalent circuits for a common phase and a unity gain start up phase configuration, respectively, of the FIG. 12 array.

FIG. 14 is a table showing the state of each of the transistor switches for the common phase and eight gain phases of the FIG. 12 second embodiment switched capacitor array.

FIGS. 16A and 16B are equivalent circuits for a alternative common and gain phases, respectively, which is also suitable for incorporating various aspects of the present invention.

FIGS. 17A, 17B and 17C are equivalent circuits for first, second and third phases, respectively, with the second phase operating to alter the voltage on the capacitors so as to reduce the voltage produced on the transistor switches upon entry into the third phase.

DETAILED DESCRIPTION OF THE INVENTION

Figure 1:
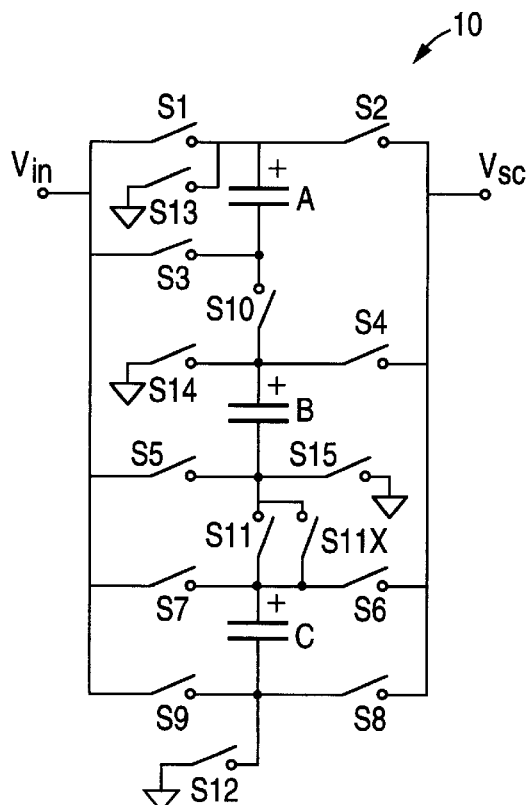
FIG. 1 is a schematic of one embodiment of a switched capacitor array having the capability of providing multiple gain configurations and which can utilize the voltage management feature of the present invention.

Referring to the drawings, FIG. 1 is a schematic diagram of a switched capacitor array, generally designated by the numeral 10. Array 10 is suitable for use in integrated circuit voltage converters, including the exemplary converter of FIG. 2. As can be seen in FIG. 1, array 10 includes three capacitors A, B and C. These capacitors, in an exemplary embodiment, are discrete capacitors which are external to the integrated circuit. For a converter circuit capable of providing an output voltage and having a drive capability of roughly 100 milliamperes, capacitors A, B and C are 0.33 µf. A hold capacitor H is connected between the output of the converter and ground and has a capacitance of 33 µf.

Array 10 further includes switches S1 through S15 used to control the connections of capacitors A, B and C. Generally, the switches which switch voltages near ground level are implemented in the integrated circuit using N type MOS transistors and the switches at more positive voltages use P type transistors. In some instances, the voltages fall within a sufficiently wide range thereby requiring the use of P and N type transistors connected in parallel and driven by complementary drive signals. In the present embodiment, switches 1–9 are implemented using a P type device, switches 12–15 using an N type device and switches 10, 11 and 11x using complementary P and N devices.

The switched capacitor array 10 is capable of providing a total of seven different gain configurations Gsc, with the gain Gsc being the ratio of the output voltage Vsc to the input voltage Vin. The output voltage of the converter Vout is equal to Vsc in the absence of regulation and load current. The gain configurations are ½, ⅔, ¾, 1, 4/3, 3/2 and 2. Gain configurations greater than one, (4/3, 3/2 and 2) are sometimes referred to as boost configurations and those which are less than one (½, ⅔ and ¾) are sometimes referred to as buck configurations.

The FIG. 5 chart shows the different gain configurations and the state of the switches which produce that gain configurations, as will be described. The chart shows a switch S11 and S11x, with these switches being connected in parallel as can be seen in FIG. 1, but controlled by different control signals. For reasons that will be subsequently explained, switches S11 and S11x are used interchangeably, with one switch being used in lieu of another in certain gain configurations.

Figure 3E:
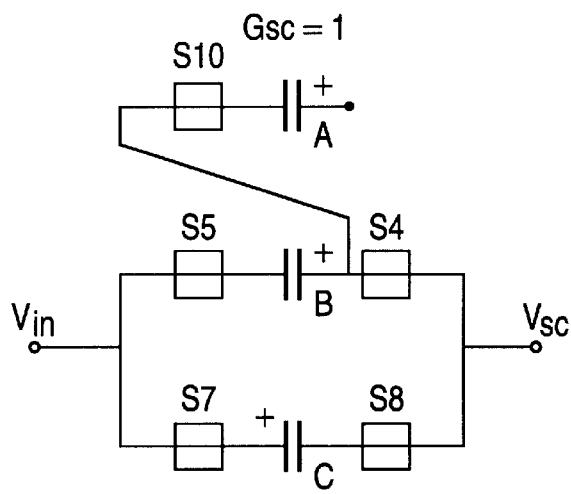

FIG. 3A is an equivalent circuit showing the capacitor array 10 is what is referred to as a common phase configuration. Each of the seven gain configurations Gsc is implemented using the common phase configuration and a unique gain phase configuration. The switched capacitor array 10 is switched between the common phase configuration of FIG. 3A and one of seven gain phase configurations. The gain phase configurations are depicted in FIGS. 3B through 3H which show the respective equivalent circuits for Gsc of ½, ⅔, ¾, 1, 4/3, 3/2 and 2, respectively. When the gain configuration Gsc of array 10 is changed, the time of the change is controlled so that it occurs when the array is in the common phase.

Referring back to FIG. 5, a switch state labeled "1" in the chart for a particular gain configuration Gsc indicates that the switch remains on during both the common and the gain phase. A switch state labeled "0" indicates that the switch remains off during both the common and gain phases. A switch state labeled "P" is turned on in the common phase and off in the gain phase. Finally, a switch labeled "S" is turned on in the gain phase and off in the common phase. The significance of the superscript designation "−" will be explained later.

In the common phase depicted in FIG. 3A, switches S3 and S2 are set to the conductive or on state thereby connecting capacitor A between the input Vin and the output Vsc (FIG. 1). Further, switches S5 and S4 are turned on thereby connecting capacitor B between the input and output. Finally, switches S9 and S6 are turned on thereby connecting capacitor C between Vin and Vout so that all three capacitors are connected in parallel between the input and output. The remainder of the switches not depicted in FIG. 3A are turned off. Note that the "+" designation associated with the capacitors indicates a particular one of the two terminals of the capacitor rather than the polarity of a voltage across the capacitor.

Assuming that the desired gain configuration Gsc is ½, array 10 will be switched between the FIG. 3A common phase and the gain phase represented by the equivalent circuit of FIG. 3B. Switches S6 and S11 are turned on thereby connecting the terminal of capacitor B that was connected to Vin to be connected to Vsc. In addition, switch S14 is turned on causing the +to terminal of capacitor B that was connected to Vout to be connected to the circuit common. Capacitors A and C remain connected between Vin and Vsc and can be ignored in the analysis of the gain phase for G=½. The other switches of the array are turned off.

By inspection of FIG. 3A, it can be seen that the common phase will produce equal voltages across capacitors A, B and C in accordance with equation (1)

$$V_B \text{ (or } V_A \text{ or } V_C) = \text{Vsc-Vin} \tag{1}$$

By inspection of FIG. 3B is can be seen that Vsc in the active phase is as follows:

$$\text{Vout} = -V_B \tag{2}$$

By simultaneously solving equations (1) and (2), the gain of the array is set forth in equation (3).

$$\text{Gsc} = \text{Vsc/Vin} = \text{½} \tag{3}$$

Figure 5:
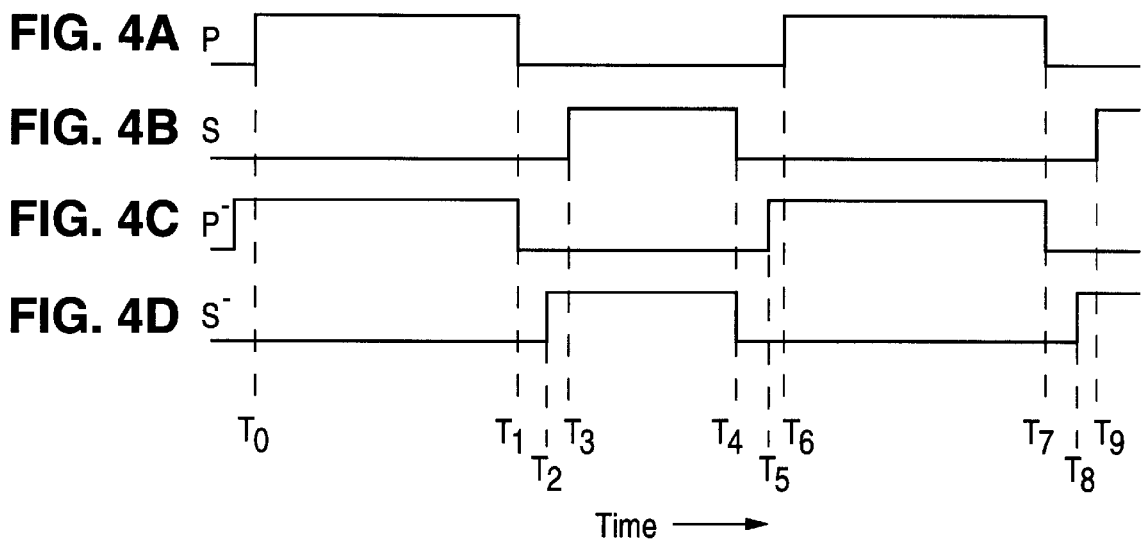
FIG. 5 is a chart showing the state of the switches of the FIG. 1 switched capacitor array for various gain configurations.

The chart of FIG. 5 further illustrates the foregoing where, for the Gsc=½ column, the "1" designation associated with switches S2 and S6 indicates that both of these switches are on during both the common and gain phases. The "0" designation indicates that switches S1, S7, S8, S10, S11, S12, S13 and S15 are off in both phases. The "P" designation indicates that switches S3, S4, S5 and S9 are on in the common phase and off in the gain phase. The "S" designation in the chart indicates that switches S11x and S14 are on in the gain phase and off in the common phase.

FIG. 3C shows the active phase for gain configuration Gsc=⅔. The charge on the capacitors in the common phase is represented by equation (1), above. As can be seen by inspection of FIG. 3C, the output voltage Vsc is represented by the following equation (4):

$$\text{Vsc} = -V_C - V_B \tag{4}$$

Since $V_C$ is equal to $V_B$, equation (4) can be rewritten as follows:

$$V_B = -\text{Vsc/2} \tag{5}$$

Combining equation (1) with (5) results in the following:

$$\text{Gsc} = \text{Vsc/Vin} = \text{⅔} \tag{6}$$

The equivalent circuit of the gain phase for Gsc=¾ is shown in FIG. 3D. By inspection, Vsc is equal to the following:

$$\text{Vsc} = -V_C - V_B - V_C \tag{7}$$

As indicated by equation (1), since the voltage drop across the capacitors are all equal, Vsc is equal to the following:

$$V_{sc} = -3V_C \quad (8)$$

and $$V_{sc} - V_{in} = V_C \quad (9)$$

so that $$V_{in} = -4V_C \quad (10)$$

thus $$G_{sc} = V_{sc}/V_{in} = \tfrac{3}{4} \quad (11)$$

FIG. 3E is the gain phase for unity gain ($G_{sc}=1$). A gain of one is achieved by reversing the polarity of one or all of the capacitors, such as capacitor C shown in the figure, from the common phase. This results in the capacitors becoming fully discharged to that $V_{sc}=V_{in}$. Note that capacitor A is disconnected from the input so as to reduce noise feed through back to the input. In order to avoid both terminals of capacitor from being at a high impedance state and at some unknown voltage, switch S10 is turned on to hold one terminal of capacitor A at a known voltage.

Figure 3F:
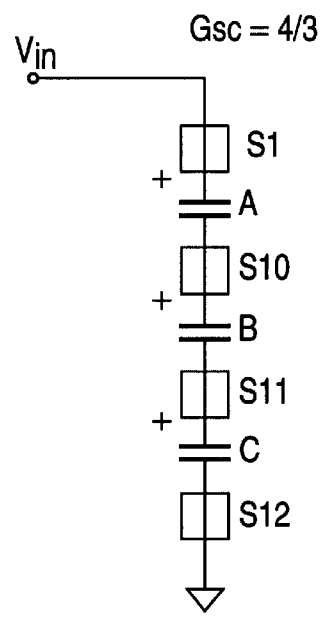

FIG. 3F shows the configurations where $G_{sc}$ is $\tfrac{4}{3}$. By examination, it can be seen that Vin is represented by equation (12) below:

$$V_{in} = V_A + V_B + V_C \quad (12)$$

Since all three capacitor voltages are always the same, $V_B$ (or $V_C$ or $V_A$) are as follows:

$$V_B = V_{in}/3 \quad (13)$$

Combining equation (12) with (13) results in the following:

$$G_{sc} = V_{sc}/V_{in} = \tfrac{4}{3} \quad (14)$$

The operation of the remaining gain configurations can be confirmed by a similar analysis. It can be seen from the foregoing that the buck gain configurations are achieved by connecting one (FIG. 3B), two (FIG. 3C) or three (FIG. 3D) of the capacitors in series between output Vsc and ground. The boost configurations are achieved by connected one (FIG. 3H), two (FIG. 3G) and three (FIG. 3F) in series between input Vin and ground. Note that although the FIG. 3H configuration shows two parallel capacitors C and B connected in series between Vin and ground, the circuit would provide a $G_{sc}=2$ with only one of the capacitors connected in series between Vin and Vout.

Referring again to FIG. 2, a schematic diagram of a converter circuit is shown which utilizes the FIG. 1 switched capacitor array 10. As will be explained in greater detail, the efficiency of the converter circuit is optimized by a control loop for particular combinations of inputs Vin and desired outputs Vod. In a typical application, Vin is provided by a battery having an output which drops in voltage over time. The battery voltage may, as an example, vary from +2.5 to +5.5 volts. The converter output Vout, which may be greater or less than input Vin, may vary due to changes in the current required by the load (not depicted) driven by the converter and may vary due to changes in input Vin. Thus, load and line regulation are required to maintain a desired output voltage Vout.

Figure 2:
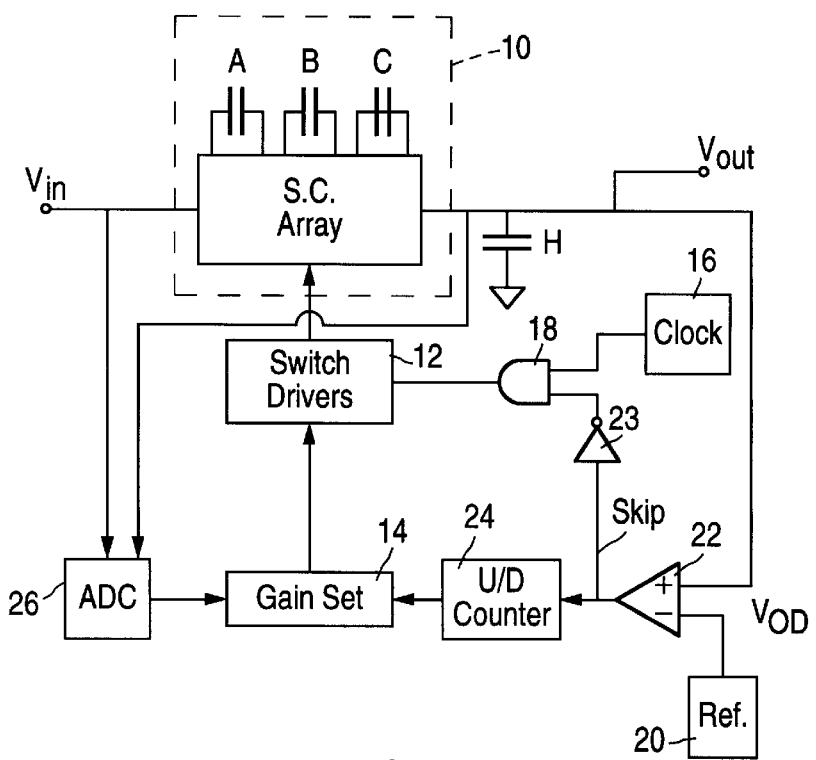
FIG. 2 is a schematic diagram of a voltage converter circuit which incorporates the switched capacitor array of FIG. 1 and the voltage management feature of the present invention.

The FIG. 2 converter includes a set of switch drivers 12 which control the state of the transistor switches S1 through S15 of array 10. Gain setting circuitry 14 operates to control the switch drivers 12 so that the switched capacitor array 10 will have one of the seven gain configurations Gsc set forth in the chart of FIG. 5. A clock circuit 16 provides the non-overlapping clock signals which set the frequency at which the switched capacitor array 10 switches between the common and the gain phases. The clock circuit produces a pair of non-overlapping clock signals as depicted in FIGS. 4A and 4B timing diagrams. The clock signals are not shown to scale. The FIG. 4A clock P is used to control the duration that selected switches are closed during the common phase and the FIG. 4B clock S is used to control the duration that selected switches are closed during the gain phase. As previously noted, some switches are closed during both phases for a particular gain configuration, as represented in the chart of FIG. 5 by "1".

In a typical application, the clock frequency is 1 Megahertz, with clock P being high for 430 nanoseconds ($T_0$ to $T_1$) and with clock S being high for 430 nanoseconds ($T_3$ to $T_4$) The non-overlap time period ($T_1$ to $T_3$ and $T_4$ to $T_5$) between the P and S clocks is set to 70 nanoseconds. The rising edge of clock P is advanced 20 nanoseconds to produce advanced clock P⁻ (FIG. 4C) so the non-overlap period between clock P and clock S is reduced from 70 nanoseconds to 50 nanoseconds ($T_4$ to $T_5$) Similarly, the rising edge of clock S is advanced 20 nanoseconds to produce clock S⁻ so that the non-overlap time between clock S⁻ and clock P is reduced from 70 nanoseconds to 50 nanoseconds ($T_1$ to $T_2$). As indicated in the FIG. 5 chart, a switch may be turned on during the common phase by clock P or P⁻ depending upon certain criteria to be described. Further, a switch may be turned on during the gain phase by either clock S or S⁻, depending upon the criteria. For purposes of a preliminary analysis, it can be assumed that clocks P and P⁻ and clocks S and S⁻ are the same.

As previously described, the gain setting circuitry 14 causes array 10 to change from one gain configuration Gsc to another only when the array is in the common phase. Thus, for example, when Gsc changes from ½ to ⅔, the switch over occurs when the array is in the common phase of FIG. 3A rather than going directly from the gain phase of FIG. 3B ($G_{sc}=\tfrac{1}{2}$) to the gain phase of FIG. 3C ($G_{sc}=\tfrac{2}{3}$).

Referring back to FIG. 2, a voltage reference circuit 20 produces reference voltage Vod indicative of the desired regulated output voltage Vout of the converter circuit. This value Vod is compared by a comparator circuit 22 with the actual output voltage Vout. The comparator output, sometimes referred to as signal Skip, has an average value inversely proportional to the load current provided by the converter circuit. Signal Skip is used to clock an up/down counter 24 which controls the gain setting circuitry 14. The up/down counter 24 has seven output states that set the gain of the switched capacitor array 10 to one of the seven gain states shown in the FIG. 5 chart.

The output of the comparator circuit 24 is also used to control the state of logic circuitry represented by AND gate 18. As will be explained, gate 18 operates to momentarily block and to transfer clock signals P and S to the switch driver circuitry 12 thereby controlling the amplitude of Vout. The switched capacitor array 10 must be in a gain configuration Gsc which will be sufficiently large to permit voltage regulation. An analog-to-digital converter (ADC) circuit 26 monitors the input Vin and output Vout and controls the gain setting circuitry 14 so that the switched capacitor array 10 will be at a minimum gain configuration Gsc according to equation (15) below, with Gconv being the overall gain of the converter.

$$G_{sc} \geq V_{out}/V_{in} = G_{conv} \quad (15)$$

Thus, if the input voltage Vin was nominally +3 volts and the output voltage Vout is +3.6 volts, Gconv is 1.2 (3.6/3). Thus, ADC circuit 26 will prevent the gain setting circuitry 14 from providing a gain Gsc less than 1.2. Since the gain configuration Gsc only has seven discrete values, the gain setting circuitry will set the minimum gain Gsc to 4/3 (1.33). Note also that if Gsc were exactly equal to Gconv, the converter would have essentially no output current capability so that it is likely that a higher gain configuration would be selected as will be explained.

The converter of FIG. 2 contains two control loops including a first loop which includes gate 18 and a second loop which includes gain set ting circuitry 14. Assuming that the switched capacitor array 10 has sufficient gain Gsc in accordance with equation (15), changes in output voltage Vout will generally be attributable e to changes in the load current or input Vin. As previously noted, the output of the comparator 22, signal Skip, has an average value which is inversely proportional to the load current. If the load current should increase, output Vout will drop below Vod in which case the Skip output of comparator 22 will go low thereby enabling gate 18 by way of inverter 23. Thus, the capacitor array 10 will be clocked (pumped) thereby increasing the output Vout. If the actual output Vout exceeds the desired output Vod due to a drop in load current, the high Skip output of comparator 22 will cause inverter 23 to disable gate 18 thereby inhibiting further pumping of the array 10. This will cause the output voltage Vout to drop (assuming there is some minimum load or leakage current). Once the output has dropped sufficiently, comparator 22 will enable gate 18 so that pumping can resume. Thus, the first loop carries out a form of pulse frequency modulation (PFM) to control the output Vout in the presence of a change in load current for a particular gain configuration Gsc. As will be explained below, the gain configuration is set by the second loop.

ADC circuit 26, among other things, operates to assure that the array 10 provides the minimum gain Gsc necessary for regulation in accordance with equation (15). The second loop allows the gain Gsc to increase above the minimum gain based upon the load requirements. As previously noted, signal Skip has an average value inversely proportional to the load current. Thus, the second loop utilizes signal Skip to determine gain Gsc. If signal Skip is high for more than a first predetermined number of clock cycles, K=3 for example, the up/down counter 24 is decremented once thereby decreasing the gain configuration Gsc of array 10 by one step. Alternatively, if signal Skip is low for more than a predetermined number of clock cycles, M=4 for example, the gain configuration Gsc will be increased by one step.

Assuming in the previous example that the input Vin is +3 volts and the desired output Vod is +3.2 volts, the selected gain configuration Gsc is 3/2 and the actual output Vout is +3.25 volts. Under these conditions, it is possible to maintain Gsc at 3/2 and reduce the output Vout exclusively by way of the first loop by using pulse frequency modulation (PFM). However, in order to increase the efficiency, the up/down counter 24 is implemented so that it will be decremented one step after M=3 number of skipped pulses. This will cause the gain setting circuitry 14 to reduce the gain configuration Gsc from 3/2 to 4/3. This will increase the converter efficiency.

Although the FIG. 2 converter provides improved operation over conventional converters, it has been observed by the present inventors that the voltages produced at the various nodes of array 10 may fall outside a desired range. The problem is exacerbated in the present exemplary application where there are a wide range of input and output voltages which could appear at the input and output of the switched capacitor array 10 and the large number of different gain configurations Gsc used to provide regulation. Accordingly, the converter is implemented to carry out a voltage management function in accordance with the following criteria: no voltage of array 10 is permitted to (1) exceed the greater of Vin or Vout by more than a fraction of a forward biased PN junction voltage drop and (2) to fall below the minimum array voltage, typically circuit common, by more than a fraction of a forward biased PN junction voltage drop. Since the forward biasing voltage decreases with increases in temperature, the junction drop is assumed to be 0.5 volts, with 250 millivolts volts being the target value. As used herein, a PN junction is considered to be forward biased if the P terminal is more positive than the N terminal by 400 millivolts or more over the operating temperature.

Reference is made to the simplified converter of FIG. 6 to further illustrate certain aspects of the present invention. The FIG. 6 converter utilizes a switched capacitor array including capacitor CF and hold capacitor CH. Zener diode Z1 is connected to the output to illustrate that the converter is regulated, although other regulation techniques would typically be used including PFM as previously discussed. The switched capacitor array of FIG. 6 provides a gain Gsc of two. Vout will be smaller than 2 Vin due to the regulation provided by Zener diode Z1 and the current requirements of the load (not depicted).

In analyzing the FIG. 6 converter, assume for example, that Vin=+3 volts and that diode Z1 regulate Vout at +4 volts. In the first phase, switches SA1 and SA2 are both closed so that capacitor CF is connected between Vin and the circuit common. Thus, capacitor CF will be charged to +3 volts. In the second phase, switches SA1 and SA2 are turned off and then, shortly thereafter, switches SB1 and SB2 are turned on. Since the charge on capacitor CF will add to Vin to produce Vout, Vout will go towards +6 volts. The regulation of Zener Z1 will limit the output of to +4 volts by drawing current from capacitor CF. However, it is likely that the voltage V1 will momentarily be at +6 before the discharge takes place. Among other things, this voltage could exceed the maximum voltage of the process used to fabricate the integrated circuit in which switches SA1, SA2, SB1 and SB2 are implemented thereby possibly destroying the converter.

One aspect of the present invention is to control the relative timing of switches SB1 and SB2 at entry into the second phase when the switches are closed. Rather than close the switches at the same time, switch SB1 is closed first followed by closure of switch SB2. Thus, for example, rather than have switches SB1 and SB2 be closed in response to signal S of FIG. 4B, switch SB1 is closed first at time $T_2$ by signal $S^-$ of FIG. 4D followed by closure of switch SB2 at time $T_3$. This causes the node of voltage V1 to be effectively tied to Vout (+4 volts) by switch SB1 thereby limiting the ability of V1 to go above Vout.

The foregoing can further be illustrated by reference to the switched capacitor array 10 as used in the FIG. 2 converter. Assume that the input voltage Vin is +4 volts, the array is in the Gsc=2 gain configuration shown in FIG. 3H and the desired output voltage Vod is +4 volts so that Vout is maintained at +4 volts by PFM. As can be seen in FIG. 3H, since Vin is +4 volts the voltage drop across capacitors C and B will be +4 volts. When the array 10 is switched from the gain phase of FIG. 3H back to the common phase of FIG. 3A, the voltage across the capacitors C and B will momentarily be added to Vin which is also +4 volts. The resultant +8 volts at Vsc will be pulled down to +4 volts by the regulated output Vout. However, before this occurs, the high voltage is likely to damage the integrated circuit.

As can be seen in the chart of FIG. 5, when array 10 enters the common phase for Gsc=2, switches S4 and S6 are first closed in response to P⁻ followed shortly thereafter by closure of switches S5 and S9 in response to P. Thus, the "+" terminal of capacitors B and C will be first connected to Vsc, which is at +4 volts, prior to being connected to Vin. This reduces the maximum voltage which appears on the integrated circuit.

Reference is made to the FIG. 3B equivalent circuit which represents array 10 when Gsc is ½. As a further example, assume that Vin is +5.5 volts and Vod is +2 volts. When the array is in the common phase of FIG. 3A, it can be seen that the drop across capacitor B is +3.5 volts. When capacitor B is switched to the gain phase of FIG. 3B, the voltage across the capacitor will be subtracted from the output of +2 volts. This will cause the "+" terminal of capacitor B to go below ground level to −1.5 volts.

This size of voltage drop below ground will, among other things, potentially damage the integrated circuit. However, as can be seen in the FIG. 5 chart for Gsc=½, switch S14 is closed first, as indicated by the designation "S⁻", thereby connecting the "+" terminal of capacitor B to ground, followed by closure of switch S11x. Switch S11x is switched later as indicated by the designation "S" which, through switch S6 (which is on during both the common and gain states as indicated by "1") connects the other terminal of capacitor B to output Vsc (or Vout). Thus, the size of the voltage drop of the "+" terminal of capacitor B below ground is substantially reduced.

As previously noted, the difference in time between the closure of the switches for entry into the common phase or gain phase is 20 nanoseconds in the disclosed embodiment. This time difference may be adjusted depending on many factors, including the time required to turn on the P and N type transistor switches. It is preferable that the time difference be at least as great as the time required to turn on the first switch or switches to close. Thus, the last switch (or switches) to close should not commence to close until the first switch (or swithces) to close have completed closing. Accordingly, if the first switch to close requires 10 nanoseconds to switch from a non-conductive to a conductive state, the minimum time difference is preferably 10 nanoseconds so that the difference between P and P⁻ and the difference between S and S⁻ is at least 10 nanoseconds.

Although controlling the relative timing that selected switches are closed will significantly reduce the voltages produced at the various nodes of the switched capacitor array 10, the voltage levels may remain unacceptable. Returning to the example of FIG. 6, FIG. 8A is an equivalent circuit when switch SB1 is closed prior to SB2 so as to minimize the magnitude of voltage V1. Resistors $R_{SB2}$ and $R_{SB1}$ the resistances of on transistor switches SB2 and SB1, respectively, together with the associated resistance of the relevant metal track on the integrated circuit connecting the switches to the input Vin, output Vout and to capacitor CF. Current $I_1$ represents the current flowing to the output, with current $I_1$, including load current and current required by Zener Z1. Voltage $V_1$ will be produced at the "+" terminal of capacitor CF in accordance with the equation (16) below at the beginning of the active phase.

$$V_1 = V_{out} + I_1 * (RSB_1) \tag{16}$$

Switches SB2 and SB1 are typically implemented using P type MOS transistors, with a cross-section of a P type transistor being shown in FIG. 7A. Depending upon the actual process used, the P type transistor is typically formed in an N well 28 which is, in turn, formed in a P type substrate 30. Diffusions 32A and 32B form the source/drain of the transistor. In order to provide proper operation, the N well 28 should be connected to the most positive voltage of the converter to ensure that the N well and surrounding P structures, including the source/drains 32A/32B, are reversed biased at all times or, at minimum, not forward biased by one PN diode drop. The N wells of all of the P type transistors formed in an integrated circuit are frequently connected to a common well line which is connected to the most positive voltage on the integrated circuit. Since the most positive voltage may be Vin during one operating mode and Vout during another mode, the common well line is connected to both Vin and Vout through Schottky diodes D1 and D2, respectively. Thus, when Vin is greater than Vout, diode D1 is forward biased so that the N wells are at higher voltage Vin less the forward voltage drop of the Schottky diode. Diode D2 will remain reversed biased. Similarly, should Vout be greater than Vin, diode D2 is forward biased so that the N wells are at Vin less the voltage drop across the diode. Diode D1 will then remain reversed biased. As is well known, Schottky diodes utilize a metal/semiconductor junction which has an inherently low forward bias voltage as compared to a conventional diode having a PN semiconductor junction. Thus, any P type portion of the integrated circuit connected to either Vin or Vout and contacting well 28 will not have sufficient voltage to forward bias the junction at the N well. Diodes D1 and D2 can be implemented in the same integrated circuit as the transistor switches or, if the CMOS process being used does not allow such diodes, discrete diodes can be used. Alternatively, a comparator having inputs connected to Vin and Vout can be used to select the highest voltage for biasing the wells.

Since Vout was set to +4 volts in the example, Vout is the most positive voltage of the converter and is the node to which N well 28 is connected by forward biased diode D2. However, an examination of equation (16) indicates that N well 28 will be at a voltage greater than Vout by an amount equal to $I(R_{SB1})$. This voltage could easily exceed a PN diode voltage drop which is typically +0.7 volts or even less at elevated temperatures. Thus, the junction formed by the P type source/drain 32A,32B of transistor switch SB1 and the N well can be forward biased.

Returning to the previous example for the FIG. 6 array. Assume again that zener diode Z1 sets Vout to +4 volts and the input Vin is at +4 volts. There will be an initial charge on capacitor CF of +4 volts set during the first phase. The "+" terminal of the capacitor will be first connected to Vout. Since Vin is at +4 volts, the drop across capacitor CF is +4 volts and Vout is +4 volts, the difference voltage of +4 volts will be initially dropped across switches SB1 and SB2 and will have a polarity which will cause current I1 to flow in the direction indicated in FIG. 8A. An inspection of the FIG. 8A circuit indicates that voltage V1 is represented by the following equation:

$$V1 = V_{out} + V_{RSB1} \tag{17}$$

with voltage $V_{RSB1}$ being the voltage drop across $R_{SB1}$. As previously discussed, switch SB1 is closed followed shortly by closure of switch SB2. At the time prior to closure of switch SB2 and after closure of switch SB1, switch SB2 is a very high impedance and switch SB1 is a low impedance so that essentially all of the voltage dropped across the two switches, +4 volts in the present example, is dropped across SB2. When switch SB2 is closed, the initial current flow through the two switches is determined by the voltage drop across switch SB2 divided by the on resistance of the switch SB2, namely, $R_{SB2}$. Thus, the initial current I1 magnitude will be inversely proportional to $R_{SB2}$. This initial current will flow through $R_{SB1}$ so that the initial voltage $V_{RSB1}$ will be proportional to $RSB_1$. Thus, it can be seen that the initial voltage across $RSB_1$ can be minimized, and thus V1 minimized, by proportioning the two resistances as follows:

$$R_{SB1} << R_{SB2} \quad (18)$$

In a typical application, $R_{SB1}$ and $R_{SB2}$ are on the order of 1 to 1.2 ohms. A significant portion of the resistance is attributable to the metal track connecting the transistor switch to the external pins of the integrated circuit, including input and output pins and the pins to which the external capacitors are connected. One approach would be to increase the value of $R_{SB2}$ which will reduce voltage V1. However, this will increase the output resistance of the converter and thus reduce the converter output current capabilities. It is preferable to reduce the resistance of $R_{SB1}$. This is accomplished by increasing the number of fingers of the transistor that forms switch SB1 by a factor of three compared to the transistor that forms switch SB2 so that the effective ratio of channel width to length (W/L) is three times greater. Since L is a constant, the ratio is adjusted by changing width W. The effective resistance of the metal tracks associated with switch SB1 are also decreased by a factor of three compared to the tracks associated with switch SB2. After having accounted for any difference in length of the metal tracks, the width of the respective tracks can also be set to a desired ratio. This ratio is maintained notwithstanding changes in track thickness, since such changes in thickness will affect both tracks in the same manner. Thus, a ratio of $R_{SB1}/R_{SB2}$ of 1 to 3 is achieved.

Returning to the example of FIG. 3B, FIG. 8B is an equivalent circuit showing one terminal of capacitor B in the gain phase connected to ground by way of the effective resistance $R_{S14}$ which is the resistance of switch S14 and the associated metal track resistance FIG. 8B also shows the "+" terminal of capacitor B connected to output Vsc by way of effective resistance $R_{S11x}$ and $R_{S6}$ which are the resistances of respective switches S11x and S6 and the associated metal track.

Switch S14 is an N type MOS transistor which, as shown in the FIG. 7B cross-section, includes N type source and drain regions 34A/34B formed in the P type substrate 30. Substrate 30 should be connected to the most negative voltage on the integrated circuit so that the substrate never becomes forward biased relative to the N type structures formed in the substrate including the source/drain regions 34A/34B. It can be seen by inspection of the FIG. 8B diagram that the voltage $V_B$ is a s follows:

$$V_B = -I_B * R_{S14} \quad (19)$$

As indicated by equation (19), $V_B$ is of a polarity such that, if sufficiently large, would forward bias the P type substrate of the transistor switch S14 relative to the N type drain/source 34A, 34B. In order to minimize the likelihood of this occurrence, resistor $R_{S14}$ is made to be much smaller than the sum of $R_{S11x}$ and $R_{S6}$, for the reasons previously set forth in connection with FIG. 8A. It should be noted that the term body is sometimes used herein to collectively refer to the semiconductor region where the drain/source regions are disposed, including N well 28 (FIG. 7A) of the P type MOS transistor and the P substrate 30 (FIG. 7B) of the N type MOS transistor.

The table of FIG. 11 shows the resistance values for the resistance paths associated with each of the switches S1 through S15. For the boost configurations (Gsc=⅓, ½ and 2), the resistance paths of the array 10 when in the common phase shown in FIG. 3A are the paths that should be controlled. In general, the last switch to be closed when entry into the common phase should be the switch with the larger resistance since that is the switch which determines the initial magnitude of the current at the beginning of the common phase. This is consistent with the equivalent circuit of FIG. 8A where switch SB1 is the first switch to be closed and the resistance of path associated with switch SB2 is set high relative to that of switch SB1.

As can be seen from the chart of FIG. 5, for the common phase associated with Gsc=⅓, switch S2 is closed before S3, switch S4 is closed before S5 and switch S6 is closed before S9. Thus, upon entry into the common phase, the path resistance associated with switch S3 should be made larger than the resistance associated with switch S2. The same is true with the resistance associated with S5 relative to S4 and the resistance associated with S9 relative to S6. As can be seen from the chart of FIG. 11, the paths associated with switches S3, S5 and S9 are each have a resistance set to 2 Ω whereas the paths associated with switches S2, S4 and S6 all have a resistance set to ⅔ Ω. Since these paths are used in all of the common phase, the paths retain the relative resistances in all gain configurations.

The timing of the switch closures for the gain phases when the gain configuration is boost (Gsc=⅓, ½ and 2) is selected for reasons other than voltage management. As can be seen in the FIG. 5 chart, for example, for Gsc=½, switches S10 and S15 are closed prior to closure of switch S1. The purpose of sequentially closing the switches is for the purpose of reliability rather than voltage management. If the switches were all actuated at the same time, the switches will actually close at different indeterminate times and possible result in erratic operation.

For the buck configurations (Gsc ½, ⅔ and ¾), the voltage management issues arise in the gain phase as opposed to the common phase. Thus, as indicated in the FIG. 5 chart, for Gsc=½ (FIG. 3B), switch S11X is the last switch to close. Thus, the initial current magnitude is inversely proportional to the size of the resistance path associated with switch S11X. As can be seen in FIG. 11, the path associated with S11X has a large resistance of 10 Ω as opposed to the series resistance of the path associated with switches S14 which is ½ Ω. This resistance ratio will thus reduce the magnitude of the initial current for the reasons previously set forth. Some of the path resistances, including those associated with switches S1, S7 and S8 are not critical and are set to 1 Ω.

Referring back to equation (16), it can be seen that it is possible to further reduce the voltage V1 of FIG. 8A to an acceptable level by controlling the maximum value of current $I_1$ under all operating conditions. This can be accomplished by limiting the maximum value of the gain configuration Gsc of the switched capacitor array 10 while assuring that the necessary minimum gain is maintained in accordance with equation (15), with the zener voltage being Vod. For the FIG. 6 circuit, Gsc is 2. The overall gain of the regulated converter Gconv is equal to the regulated output voltage Vout of +4 (Vod) divided by the input Vin of +3 or 4/3. The output current $I_1$ of equation (16) can be reduced by limiting the value of Gsc so that it is greater than Gcv, but not any greater than needed to provide a specified rated output current. If Gsc is set equal to Gcv, the output current capability is reduced to essentially nothing. If Gsc is set to a very large value relative of Gcv, the converter will have ample output current capability, but one or more of the nodes of the switched capacitor array may go outside the desired range.

The foregoing can be further illustrated by returning to the example of FIG. 6. It was previously assumed that Vin and Vout were both +4 volts, with the circuit providing a gain configuration of Gsc=2. This results in a difference voltage of +4 volts being dropped across switch resistance $R_{SB2}$ just as the switch is closed. The initial current I1 is thus directly proportional to the size of the difference voltage. In order to further reduce the magnitude of the initial current, it is desirable to reduce the size of the difference voltage by replacing the array of FIG. 6 with an array capable of providing a Gsc of less than 2. Thus, for example, if the gain configuration was selected to be Gsc=3/2, the charge on capacitor CF would be +2 volts rather than +4 volts when Gsc=2. When the +2 volts is added input voltage in the second phase, the difference voltage would be +2 volts rather than +4 volts. Since the lower Gsc value will reduce the output current capability of the converter, the gain configurations are carefully controlled so that the minimum specified output current is provided, as will be explained.

Figure 9:
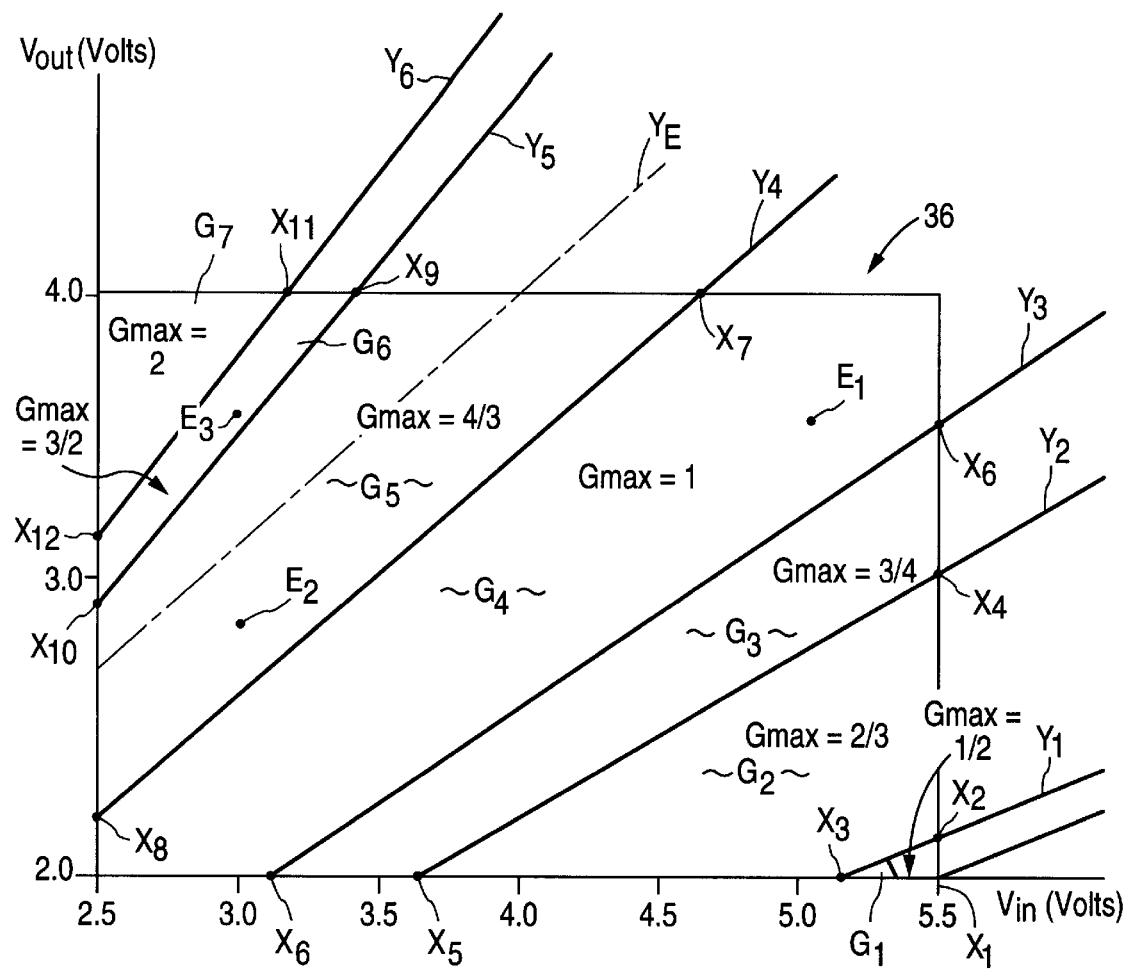
FIG. 9 is a gain map for an exemplary converter circuit showing maximum gain configuration settings for various input and output voltage combinations.

FIG. 9 is a gain map 36 of the FIG. 2 converter, showing the maximum gain configuration Gsc for all combinations of specified input voltages Vin and output voltages Vout for a given output current rating. The gain map 36 is divided in to seven maximum gain regions G1 through G7 by lines Y1 through Y6. ADC circuit 26 (FIG. 2) is implemented to determine, based on inputs Vin and Vout, the gain region in which the converter is operating and to control the gain setting circuitry 14 accordingly. Alternatively, the maximum gain could be selected based only upon Vin provided the magnitude of Vin is known. As previously described, ADC circuit 26 also functions to prevent array 10 from going below the minimum gain Gsc as set forth in equation (15) based upon inputs Vin and Vout.

An empirical method of producing the FIG. 9 gain map has been found to be the preferred approach. This method utilizes computer simulation of the switched capacitor array 10 based upon conventional models which take into account the characteristics of the transistor switches and the metal tracks. In addition, the simulation controls the state of the transistor switches and the different timing of the switches as a result of the PFM used in regulating the output. During simulation, one of either Vin or Vout is maintained at a constant value while the other value is changed. Simulation is limited to voltages that are located on the periphery of the gain map 36, those being the worst case conditions. For each change, the voltages that appear on the drain and source of the transistor switches are monitored to ensure that these nodes do not fall outside the prescribed voltage ranges. If a voltage does fall outside the range, the maximum permissible gain for a particular set of Vin and Vout values is reduced until simulation confirms that all nodes fall within the prescribed limits. Although such reduction in maximum gain operates to limit the maximum current output of the converter, this compromise results in superior operation of the converter.

Point X1 on the map 36 represents an maximum specified input voltage Vin of the converter of +5.5 volts and the minimum output voltage Vout of +2 volts. This corresponds to a converter gain Gconv of 0.36. Simulation confirms that a gain configuration of Gsc=½ (FIG. 3B) does not result in any of the nodes falling outside the previously-described voltage limits for the conditions that exist at point X1. In addition, the gain configuration is sufficiently large to provide the rated output current. Since Gsc=½ is the lowest gain configuration, the minimum gain limitation of equation (15) is complied with automatically.

The location of line Y1 determines the upper limit of gain range G1. Gain range G1 defines the range of Vout and Vin where the gain Gsc cannot exceed ½. The location of line Y1 is determined by simulating the capacitor array for a gain configuration of ⅔ (FIG. 3C), that being the gain one step higher than Gsc=½. Among other things, the simulation is carried out assuming that relative timing of the relevant transistor switches is controlled in accordance with the chart of FIG. 5 and that the appropriate switch resistances have been controlled. For gain configurations less than unity (buck), the worst case conditions occur when the array is switched between the common phase and the gain phase at a slow clock rate. This simulates the conditions where the PFM is causing clock pulses to be skipped. For gain configurations greater than unity (boost), the worst case conditions occur when the array 10 is switched at the maximum rate where no pulses are skipped.

In the simulation for Gsc of ⅔, the value of Vin is fixed at +5.5 volts and the value of Vout is set at some arbitrary value greater that +2.0 volts, such as +3.5 volts. The value of Vout is decreased incrementally, with the capacitor array 10 nodes being monitored after each decrease. It can be seen that by decreasing voltage Vout, the difference between Vout and Vin will increase thereby increasing the voltage drop across capacitors B and C in the common phase configuration of FIG. 3A. Since clock pulses are skipped in the simulation, there will be ample time for the capacitors to become fully charged thereby achieving worst case conditions.

When capacitors B and C are switched from the common phase to the gain phase configuration for Gsc=⅔ shown in FIG. 3C, the magnitude of the current flow through the capacitors B and C will be in a direction away from ground and will be relatively large. As previously described in connection with the FIG. 8B, this will tend to cause one of the nodes associated with switch S14 to go below ground. Simulation indicates that Vout can be reduced to +2.11 volts, with any further reduction causing the voltage at the relevant node to drop more than 0.25 below ground and thus violate the voltage management criteria. Thus, for any further decrease in Vout below +2.11, the gain Gsc should be switched from ⅔ down to ½. Thus, line Y1 which separates gain region G2 (Gmax=⅔) from G1 (Gmax=½) will intersect point X2, with X2 being at Vout=+2.11 volts and at a Vin=+5.5 volts. Line Y1, which has a slope (Vout/Vin) of 0.384 (+2.11/+5.5), extends down to point X3 where Vout is +2 volts and Vin is +5.21 volts (+2/0.384). Further simulation will confirm that the node voltages at X3 do not cause a violation of the voltage management criteria. ADC circuit 26 (FIG. 2) will monitor the ratio of Vout/Vin and will control the gain set circuitry 14 so that the gain Gsc of ½ cannot be exceeded for combinations of Vin and Vout that fall within gain range G1.

The location of line Y2 which separates gain region G2 (Gmax=⅔) from G3 (Gmax=¾) can be determined next. Computer simulation is carried out with the array in the Gsc=¾ configuration with Vin at +5.5 volts and Vout set at some arbitrarily high value such as +4.0 volts. Vout is again incrementally decreased thereby increasing the differential voltage as previously described. Eventually, one of the nodes associated with switch S13 will begin to drop ground potential by 0.25 volts. That occurs, for example, at +3.05 volts. Accordingly, line Y2, which separates the gain region G2 (Gmax=⅔) from the region G3 (Gmax=¾), intersects the Vin=+5.5 line at Vout=+3.05. ADC circuit 26 causes the gain setting circuitry 14 to switch between Gsc=¾ and Gsc=⅔ when the ratio of Vout/Vin crosses over 0.55 (+3.05/+5.5). Line Y2 intersect the Vout=+2 volt line at point X5 (Vin=+3.6 volts) which computer simulation confirms does not result in a violation of the voltage management criteria. Note that when the converter is operating within maximum gain region G2 (Gsc=⅔), it is possible that a lower gain configuration can be used (Gsc=½ in this instance) provided the lower gain does not violate the minimum gain requirements based upon Vin and Vod as set forth in equation (15).

The location of X6 on the Vin=+5.5 volt line which defines line Y3 is Vout=+3.6 volts. Again, this is determined by computer simulation, where Vout is reduced from +4 volts down to +3.6 volts, a point just prior to a switch node falling outside the voltage management criteria.

Gain region G5 for Gmax=⅓ (FIG. 3F) requires special treatment. Assume, by way of example, that Vin is greater than Vout so that in the common phase, the polarity of the voltage with respect to the "+" side of the capacitors A, B and C is negative with respect to the other side of the capacitors. When array 10 is switched to the gain phase of FIG. 3F, the polarity of the capacitor voltages will be such that the current will flow in a direction towards ground. Should the "+" terminal of capacitor A be connected first to Vin, the resultant voltage drop across the finite resistance of switch S1 will tend to cause the voltage at the switch to exceed Vin and thereby violate the previously-described voltage management criteria. Alternatively, should the terminal of capacitor C be connected first to ground, the voltage developed across the finite resistance of switch S12 to go below ground level thereby again violating the voltage management criteria.

Figure 10:
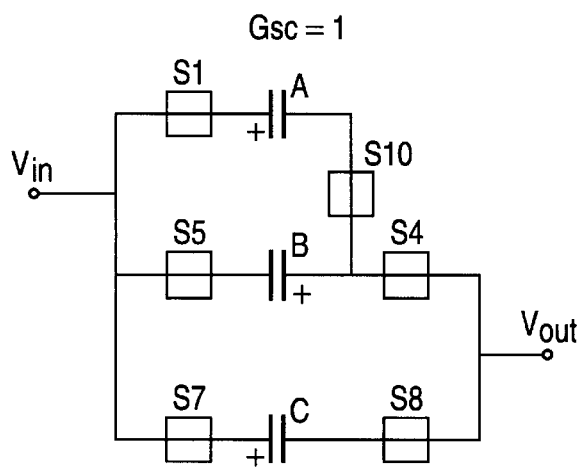
FIG. 10 is an equivalent circuit of a gain configuration used in combination with the configurations of FIG. 3A and FIG. 3F of the first embodiment switched capacitor array.

The solution is to reverse the polarity of the voltage on capacitors A, B and C prior to entry into the gain phase of FIG. 3F. This is accomplished by utilizing an additional phase intermediate the common phase of FIG. 3A and the FIG. 3F gain phase. The additional phase is the gain phase configuration for Gsc=1 shown in FIG. 10. When switching the array 10 from the common phase to the intermediate phase of FIG. 10, the polarity of the charge on capacitors A and C is reversed. Thus, when the array is then switched from the intermediate phase to gain phase of FIG. 3F, the polarity of the voltage on capacitors A, B and C is such that current flow is towards the circuit common rather than away from the common. The gain Gsc of the FIG. 10 configuration is unity which serves the reduce the overall average gain to somewhat less than Gsc of ⅓. When the array 10 is in the gain configuration of FIG. 10, the configuration does function to provide output current when Vout is less than Vin. As will be described, the three phase approach is used only when Vout is less than Vin so that the FIG. 10 configuration can still be used to control the gain using PFM.

The above-described solution to the gain configuration of FIG. 3F should be used when both of the following conditions exist: (1) the gain Gsc is greater than one (boost) and (2) the input Vin is greater than the output Vout. Line $Y_E$ on the FIG. 9 gain map 36 divides the map in two regions, including a first region above line $Y_E$ where Vin is less than Vout and a second region below the line where Vin is greater than Vout. Given the constraints on which gain configurations can be used for the different regions of the gain map 36, it has been found that the only gain configuration which provides a gain Gsc greater than one (boost) and which is to be used in the region above line $Y_E$ is the Gsc=⅓ gain configuration of FIG. 3F. Thus, the three phase approach described in connection with Gsc=⅓ only need be used in that gain configuration and only when the Vin is greater than Vout as determined by the ADC circuit 26. When Vout is greater than Vin, the normal two phase approach is used where array is switched between the FIG. 3A common phase and the FIG. 3F gain phase. Note that this three phase approach can be used in other applications Gsc less than one (buck) for purposes of voltage management, as will be described. The location of line Y4 defines the maximum gain for gain region G4 where Gmax is one. Point X7 is determined by simulating the conditions where Vout is maintained at +4.0 volts, Gsc=⅓ (two phases) and Vin is incrementally increased from some initial value, such as +4.0 volts, while the switch node voltages are monitored. At a Vin of +4.6 volts, the limits of the voltage management criteria is approached. Thus, line Y4 intersects the Vout=+4 volts at point X7 where Vin=+4.6 volts. It is confirmed that the criteria is also satisfied at point X8 where Vin=+2.5 volts and Vout is +2.17 volts.

Figure 3G:
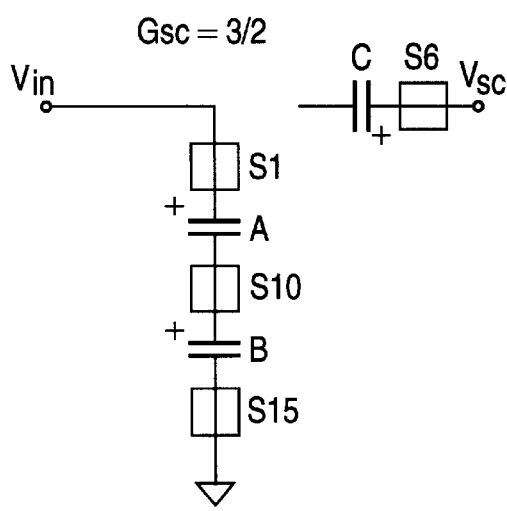
Figure 3H:
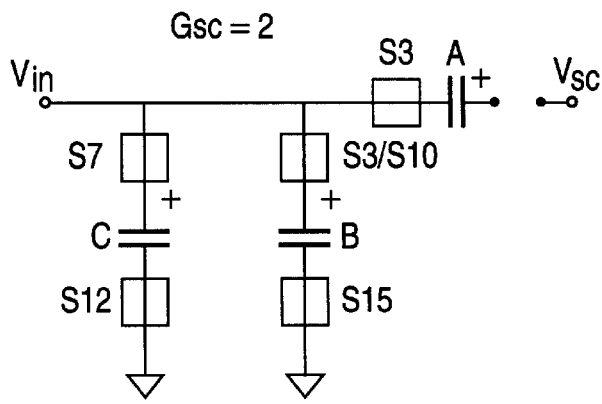

The location of line Y5 which separates gain region G6 (Gmax=3/2) from G5 (Gmax=⅓) is then determined through simulation by setting array 10 to the Gsc=3/2 gain configuration (FIG. 3G). Vout is set to +4.0 volts and Vin is set to some relatively small value such as +3 volts. Vin is incrementally increased while monitoring the relevant switch nodes. The voltage management criteria is maintained at Vin=+3.41 volts at which point one of the switch nodes approaches the criteria limits. Thus, point X9 where line Y5 intersects the Vout=+4.0 volts is +3.41 volts. Line Y5 intersects the Vin=+2.5 volts at point X10 at Vout=+2.94 volts which simulation confirms does not result in a violation of the criteria.

Gain region G7, where Gmax=2, is separated by gain region G6, where Gmax=3/2, by line Y6. The location of line Y6 is determined using simulation by setting Gsc=2 (FIG. 3H) and setting Vout=+4.0 volts. Vin is incremented from a starting point of +2.5 volts. The voltage management criteria will be violated if Vin is increased any further than +3.18. Accordingly, point X11 that defines the location of line Y6 is at Vin=+3.18 volts. It is further confirmed that point X12 where line Y6 crosses the Vin=+2.5 volts is Vout=+3.15 and that operation at this point does not result in violation of the voltage management criteria.

The manner in which the gain map of FIG. 9 is utilized by the FIG. 2 converter can be further illustrated by way of a few examples. Assume that Vin is +5.0 volt, that the desired output voltage Vod produced by reference circuit 20 is +3.5 volts and the output Vout is +3.5 volts. This combination represented on the FIG. 9 gain map by point E1 which falls within gain region G4. The current values of Vin and Vout are received by ADC circuit 26 which will limit the maximum gain to Gmax=+1 as indicated in the FIG. 9 gain map.

For Vin=+5.0 volts and Vod=+3.5 volts, the converter gain Gconv is 0.7 (3.5/5). In order to ensure proper regulation under these conditions, the gain of the array 10, Gsc, must never go below 0.7. Given the discrete number of gain configurations available, Gsc=¾ (FIG. 3D) is the minimum gain configuration. ADC circuit 26 receives Vin and Vout and will prevent the gain setting circuitry 14 from selecting a gain configuration lower than ¾.

Given the foregoing conditions, should the load current diminish, there will be a tendency for Vout to increase to some value greater than +3.5 volts. Comparator 22 will go high thereby causing signal Skip to go high thereby temporarily preventing the array 10 from being clocked by one pulse. This will cause Vout to drop (assuming load or leakage current to ground). If Vout has not dropped sufficiently, signal Skip will cause another pulse to be skipped. Should the number of consecutive skipped pulses reach K=3, up/down counter 24 will cause the gain setting circuitry 14 to reduce the gain setting Gsc of array 10 by one step. Thus, if the gain configuration is Gsc=1, Gsc will be reduced to ¾. Because the minimum gain setting is Gsc=¾, ADC circuit 26 will not permit the setting go any lower. Thus, if reducing the gain setting to Gsc=¾ does not cause Vout to drop to Vod, Vout should eventually reach Vod due to PFM, that is, when a sufficient number of pulses are skipped even if that number of skipped pulses should be greater than K=3.

If the amount of load current should increase in the present example, Vout will drop below Vod. Signal Skip will go low so that array 10 will receive a clock pulse. If Vout does not return back to Vod, signal Skip will remain low and array 10 will receive another pulse. This will continue until Vout increases to Vod or until the number of consecutive pulses reaches M=4, at which point up/down counter 24 will cause the gain setting circuit 14 to increase Gsc by one step. Thus, if the current setting is Gsc=¾, Gsc will increase to 1. If the load current is not too great, the converter output Vout will eventually reach Vod with the new gain setting. However, if the number of pulses again reaches M=4, the gain configuration will not be increased from Gsc=1 to Gsc=⁴⁄₃. That is because ADC circuit 26, having been implemented using the gain map information of FIG. 9 which defines the locations of lines Y1 through Y6, will prevent the gain setting circuitry from exceeding Gmax=1 based upon Vin and Vout received by the ADC. Thus, if Vout does not reach Vod using Gsc=1, the maximum current rating of the converter has been exceeded and the converter will fall out of regulation. This is preferable to permitting the gain to increase above Gmax, since any such increase will possibly result in damage to the converter.

By way of a further example, assume that Vin is provided by a battery source and that the battery output has dropped from +5 volts to +3.0 volts, with Vod remaining at +3.5 volts. Based upon Vin and Vout, ADC circuit 26 will prevent the gain setting circuit 14 from selecting a gain configuration any lower than Gsc=⁴⁄₃ (1.33) since Vout/Vin=1.16. Further, assume that Vout is initially at +2.7 volts. Point E2 of the FIG. 9 gain map corresponds to these values of Vin and Vout and indicates that ADC circuit 26 will prevent the gain setting circuit from going any higher Gmax=⁴⁄₃. Thus, the gain configuration of Gsc=⁴⁄₃ is the only option at this point. Furthermore, the location of point E2 relative to line $Y_E$ indicates that Vout is less than Vin so that the three phase gain configuration using the FIG. 10 circuit in combination with FIGS. 3A and 3F must be used. ADC circuit 26 will invoke the three phase configuration.

Assuming that the load current is not excessive, Vout will increase as the capacitor array 10 is pumped (clocked) so that Vout will approach the final value of +3.5 volts represented by point E2 of the FIG. 9 gain map. Once Vout is greater than Vin, the three phase operation is no longer needed and ADC circuit 26 will permit the use of the two phase operation for Gsc=⁴⁄₃. Eventually, Vout will move on the gain map from point E2 to point E3 located in gain region G6. This means that ADC circuit 26 will permit the gain configuration to go to Gmax=³⁄₂ if necessary to meet the load current requirements.

A further voltage management issue arises in connection with the converter of FIG. 2 at initial power on. At power on, the input voltage Vin will first rise rather quickly to the final value. However, since the converter output current must be increased from no output to the final output, the initial output voltage Vout will be initially at zero volts. Since the output current demands will be large, the converter will have a tendency to switch to the high gain configuration until the initial output current requirements have been met. If the converter should select certain gain configurations such as Gsc=⅔ for example, during power up, the voltage manage-ment criteria will probably be violated. Assume that Vin at power on is at +2.5 volts. Vout will initially be at zero volts so that the voltage across the capacitors in the common phase will be +2.5 volts. When the array 10 is switched to the gain phase of FIG. 3C, one terminal of capacitor C will be connected to Vsc (Vout) which is at zero volts. The polarity of the voltage across capacitor C is such that the "+" terminal connected to switch S11X will go negative by the full voltage drop across the capacitor +2.5 volts. This is a clear violation of the voltage management criteria. As will be explained in connection with an alternative embodiment switched capacitor array, the start up problem can be addressed by using a special gain phase configuration at start up.

One of the shortcomings of array 10 of FIG. 1 is that the value of the resistance path S11X is rather large (10 Ω) thereby causing the output impedance of the converter to be high in those gain configurations where switch S11X is used. FIG. 12 shows an alternative array 10A which all of the relevant resistance paths are a relatively low value so that a low output impedance is achieved. Array 10A includes switches S1A through S18A and capacitors A1, B1 and C1.

The FIG. 12 array 10A is capable of being switched between a common phase as is shown in FIG. 3A for array 10, to one of seven gain phases (Gsc=½, ⅔, ¾, 1, ⁴⁄₃, ³⁄₂ and 2) as are shown in FIGS. 3B through 3H. The particular switches used to configure that array 10A to the various gain configurations are shown in the table of FIG. 14, as is the timing of the closures used to implement the voltage management function. The same rationale used to select the relative timing of the switch closures of the FIG. 1 array 10 is applied to the FIG. 12 array 10A. By way of example, FIG. 13A shows the common phase and identifies the switches that are used to provide this phase. In the boost gain configurations (Gsa=⁴⁄₃, ³⁄₂ and 2), the switches adjacent the output Vsc are turned on first in the common phase as indicated in the table of FIG. 14. For example, for Gsc=⁴⁄₃, switch S2A is turned on prior to switch S3A as indicated by the respective designations "P⁻" for switch S2A and "P" for switch S3A shown in FIG. 14. The "⁻" designations associated with "1" in FIG. 14 means that the switch is on in both the common and gain phases and that when switching to the associated gain configuration for the first time, the switch is closed. Thus, for example, when array is in the gain configuration of Gsc=⁴⁄₃ and in the gain phase, switch S6A will be off as it is in all gain phases. when Gsc is increased to ³⁄₂, the array will switch from the gain phase for Gsc=⁴⁄₃ to the common phase for Gsc ⅔, with the designation "⁻" indicating that switch S6A will be turned on prior to switch S9A when entry is first carried out. Switch S6A will then remain on during both the gain and common phase in the Gsc=⅔ configuration as indicated by the "1" designation.

FIG. 13B shows the equivalent circuit for Gsc=1' of the FIG. 12 array 10A. This configuration is use d when power is first applied to the converter. As previously explained, under these conditions, the output Vsc (Vout) will initially be a ground potential which will result in a relatively large voltage being developed across the capacitors in the common phase. once the array has pumped sufficient current to raise the output voltage to the operating level, the problem will disappear. Until that time, the converter will utilize the Gsc=1' gain configuration of FIG. 13B. As indicted by the table of FIG. 14, switch S13A is initially turned on thereby connecting the "30" terminal of capacitor A to ground. Since the remaining capacitor terminal is floating, the large voltage induced on the capacitor will not cause any node to go below ground level as it would if, for example, the Gsc=⅔ configuration of FIG. 3C was used. Switch S1 8A is turned on shortly after switch S13A thereby shorting capacitor A and reducing th e voltage drop across the capacitor to zero.

When array 10A is then switched from the gain phase of Gsc=1' of FIG. 13B to the common phase of FIG. 13A, discharged capacitor C will tend to pull output Vsc up to Vin hence resulting in a unity gain configuration. The array 10A will remain in Gsc=1' at power on until Vsc has been pulled to Vin or until Vsc has been pulled up the to desired output Vod if Vod is lower than Vin. At that point, comparator circuit 22 (FIG. 2) will cause signal Skip to go active there completing the start-up sequence. At that point, the gain configuration Gsc=1' is no longer needed and the remaining seven gain configurations (Gsc=½, ⅔,¾, 1, ⅓, 3/2 and 2) are used.

Figure 15:
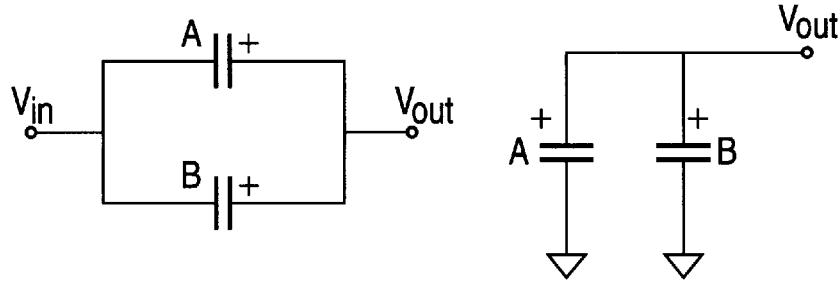
FIG. 15 is a table showing the resistance values for the current paths associated with each transistor switch of the second embodiment switched capacitor array of FIG. 12.

The resistance paths associated with the switches of array 10A are shown in the table of FIG. 15 and the relative sizes are selected for voltage management using the same rationale used in connection with the array 10. Thus, for example, the resistance path associated with switch S3A is selected to be high relative to the path associated with switch S2A. According to the table of FIG. 15, the ratio is three (1.2 Ω/0.4 Ω). Note that all of the resistance paths have resistance values significantly less than the 10 Ω of switch S1iX of array 10 meaning that the output impedance of the array 10A is significantly lower than that of array 10.

The gain map for array 10A is generally the same as shown in FIG. 9 for array 10. The manner in which the actual positions of the lines Y1 through Y6, which define the maximum gain regions G1 through G7, is determined is the same and is preferably performed empirically using computer simulation.

Thus, a switched capacitor array which incorporates a voltage management function has been described. The voltage management function has several aspects including (1) controlling the relative timing of transistor switch closures, (2) controlling the ratio of resistance paths, (3) limiting the maximum gain configuration and (4) using intermediate phases in addition to the common and gain phase. All or any combination of the above aspects can be beneficially used in switched capacitor array circuit application. Although one embodiment of the switched capacitor array incorporating the voltage management function has been described in some detail in connection with a voltage converter which utilizes a particular switched capacitor array 10 configuration, the invention is readily applicable to different types of voltage converters utilizing different types of arrays. By way of example, FIGS. 16A and 16B depict an equivalent circuit for a three capacitor array which switches between a first state (FIG. 16A) and a second state (FIG. 16B). As indicated by FIG. 16B, the voltage across each of the capacitors is equal to Vin. When the capacitors are connected in series between the input and output with the polarities shown in FIG. 16A, the voltage across the three capacitors (3*Vin) is added to Vin to provide a gain Gsc of 4 (3*Vin+Vin). Assuming the a regulator (not depicted) operates to maintain Vout at substantially less that 4*Vin, in accordance with the present invention, the capacitors should be connected to Vout before connecting to Vin. Further, the resistance path for connecting to Vin is preferably made larger than the path for connecting to Vout.

As previously noted, it is possible to use the three phase approach in gain configurations other than boost configurations in order to provide a degree of voltage management. Assume, for example, that a capacitor array includes two capacitors and the possible gains are Gsc=1, ⅔ and ½. In those applications where the minimum necessary gain is ½ (Vout is greater than ½ Vin), the gain configuration of Gsc=⅔ is achieved by switching from the common phase shown in FIG. 17A to an intermediate phase of Gsc=½ shown in FIG. 17B, to a third phase of Gsc=⅔ shown in FIG. 17C and then back to the common phase of FIG. 17A. The transition through the intermediate phase of Gsc=½ will operate to reduce the voltage across the two capacitors so that when the array is switched to Gsc=⅔, the voltages at the nodes of the array will have a reduced tendency to violate the previously-noted voltage management guidelines.

It is to be further understood that other changes can be made by those skilled in the art without departing from the spirit and scope of the invention as defined in the appended claims.

What is claimed is:

1. A switched capacitor circuit comprising:
   a first capacitor having first and second terminals;
   a plurality of transistor switches connected to the first and second terminals of the first capacitor; and
   drive circuitry for controlling a state of the transistor switches, with the drive circuitry alternating between a first phase where the capacitor is connected by the switches in series between an input node and an output node and a second phase where the capacitor is connected in series between one of the input and output nodes and a third node, with a first current path being defined between the capacitor and the input node in the first phase having a resistance selected to be at least twice a resistance of a second current path defined between the capacitor and the output node in the first phase.

2. The switched capacitor circuit of claim 1 wherein the drive circuitry connects the capacitor to the input node and to the output node at different times when going from the second phase to the first phase, with the different time being selected so as to minimize a voltage produced on the switches.

3. The switched capacitor circuit of claim 2 wherein the drive circuitry connects the capacitor to the one of the input and output nodes and the third node at different times when going from the first phase to the second phase, with the different time being selected so as to minimize a voltage produced on the switches.

4. The switched capacitor circuit of claim 3 wherein the third node is a circuit common.

5. The switched capacitor circuit of claim 3 wherein the drive circuitry connects the capacitor in series between the output node and the third node in the second phase and wherein the drive circuitry connects the capacitor to the third node before connecting the capacitor to the output node when going to the second phase.

6. The switched capacitor circuit of claim 2 wherein the drive circuitry connects the capacitor in series between the input node and the third node in the second phase and wherein the drive circuitry in the first phase connects the capacitor to the output node before connecting the capacitor to the input node.

7. The switched capacitor circuit of claim 6 wherein the drive circuitry passes through the first phase followed by a third phase which is followed by the second phase, with the drive circuitry in the third phase connecting the capacitor in series between the input and output nodes and with a polarity opposite to that when the capacitor is connected between the input and output nodes in the first phase.

8. The switched capacitor circuit of claim 6 wherein the circuit is switchable to a low gain mode where the drive circuitry connects the capacitor in series between the output node and the third node in the second phase and to a high gain mode where the drive circuitry connects the capacitor in series between the input node and the third node in the second phase and wherein the switched capacitor circuit further includes gain limit circuitry which prevents the switched capacitor circuit from switching to the high gain mode based upon at least one of the magnitude of a voltage at the output node and the magnitude of the voltage at the input node.

9. The switched capacitor circuit of claim 8 wherein the gain limit circuitry operates based upon the magnitude of voltage at the output node relative to a magnitude of a voltage at the input node.

10. The switched capacitor circuit of claim 6 wherein the switched capacitor array is switchable to plural gain modes and wherein the switched capacitor circuit further includes gain limit circuitry which prevents the switched capacitor circuit from switching from a lower gain mode to a higher gain mode based upon at least one of a magnitude of one of a voltage at the input node and a voltage at the output node.

11. The switched capacitor circuit of claim 1 further including a second capacitor having first and second terminals and wherein the plurality of transistors switches are connected to the first and second terminals of the second capacitor and wherein the drive circuitry in the first phase connects the second capacitor in parallel with the first capacitor and in the second phase connects the second capacitor in series with the first capacitor.

12. The switched capacitor circuit of claim 11 wherein the drive circuitry connects the capacitors to the input node and to the output node at different times when going from the second phase to the first phase, with the different time being selected so as to minimize a voltage produced on the switches.

13. The switched capacitor circuit of claim 12 wherein the drive circuitry connects the capacitors to the one of the input and output nodes and the third node at different times when going from the first phase to the second phase, with the different time being selected so as to minimize a voltage produced on the switches.

14. The switched capacitor circuit of claim 13 wherein the drive circuitry connects the capacitors in series between the output node and the third node in the second phase and wherein the drive circuitry connects the capacitor to the third node before connecting the capacitor to the output node when going to the second phase.

15. The switched capacitor circuit of claim 12 wherein the drive circuitry connects the capacitors in series between the input node and the third node in the second phase and wherein the drive circuitry in the first phase connects the capacitors to the output node before connecting the capacitors to the input node.

16. The switched capacitor circuit of claim 15 wherein the drive circuitry passes through the first phase followed by a third phase which is followed by the second phase, with the drive circuitry in the third phase connecting the capacitors in series between the input and output nodes and with a polarity opposite to that when the capacitors are connected between the input and output nodes in the first phase.

17. The switched capacitor circuit of claim 16 wherein the circuit is switchable to a low gain configuration where the drive circuitry connects the capacitors in series between the output node and the third node in the second phase and to a high gain configuration where the drive circuitry connects the capacitors in series between the input node and the third node in the second phase and wherein the switched capacitor circuit further includes gain limit circuitry which prevents the switched capacitor circuit from switching to the high gain configuration based upon at least one of a magnitude of a voltage at the input and a voltage at the output node.

18. The switched capacitor circuit of claim 17 wherein the gain limit circuitry operates based upon the magnitude of voltage at the output node relative to a magnitude of a voltage at the input node.

19. The switched capacitor circuit of claim 6 wherein the circuit is switchable to a relatively low gain configuration and to a relatively high gain configuration and wherein the switched capacitor circuit further includes gain limit circuitry which prevents the switched capacitor array from switching to the high gain configuration based upon at least one of a magnitude of a voltage at the input and a voltage at the output node.

20. The switched capacitor circuit of claim 19 wherein the gain limit circuitry operates based upon the magnitude of the voltage at the output node relative to the voltage at the input node.

21. The switched capacitor circuit of claim 1 further including second and third capacitors, each having first and second terminals, and wherein the plurality of transistors switches are connected to the first and second terminals of the second and third capacitors and wherein the drive circuitry in the first phase connects the second and third capacitors in parallel with the first capacitor and in the second phase connects the second and third capacitors in series with the first capacitor.

22. The switched capacitor circuit of claim 21 wherein the drive circuitry connects the capacitors to the input node and to the output node at different times when going from the second phase to the first phase, with the different time being selected so as to minimize a voltage produced on the switches.

23. The switched capacitor circuit of claim 22 wherein the drive circuitry connects the capacitors to the one of the input and output nodes and the third node at different times when going from the first phase to the second phase, with the different time being selected so as to minimize a voltage produced on the switches.

24. The switched capacitor circuit of claim 23 wherein the drive circuitry connects the capacitors in series between the output node and the third node in the second phase and wherein the drive circuitry connects the capacitor to the third node before connecting the capacitor to the output node when going to the second phase.

25. The switched capacitor circuit of claim 22 wherein the drive circuitry connects the capacitors in series between the input node and the third node in the second phase and wherein the drive circuitry in the first phase connects the capacitors to the output node before connecting the capacitors to the input node.

26. The switched capacitor circuit of claim 25 wherein the drive circuitry passes through the first phase followed by a third phase which is followed by the second phase, with the drive circuitry in the third phase connecting the capacitors in series between the input and output nodes and with a polarity opposite to that when the capacitors are connected between the input and output nodes in the first phase.

27. The switched capacitor circuit of claim 26 wherein the circuit is switchable to a low gain configuration where the drive circuitry connects the capacitors in series between the output node and the third node in the second phase and to a high gain configuration where the drive circuitry connects the capacitors in series between the input node and the third node in the second phase and wherein the switched capacitor circuit further includes gain limit circuitry which prevents the switched capacitor circuit from switching to the high gain configuration based upon at least one of a magnitude of a voltage at the input and a voltage at the output node.

28. The switched capacitor circuit of claim 27 wherein the gain limit circuitry operates based upon the magnitude of voltage at the output node relative to a magnitude of a voltage at the input node.

29. The switched capacitor circuit of claim 26 wherein the circuit is switchable to a relatively low gain configuration and to a relatively high gain configuration and wherein the switched capacitor circuit further includes gain limit circuitry which prevents the switched capacitor array from switching to the high gain configuration based upon at least one of a magnitude of a voltage at the input node and a magnitude of a voltage at the output node.

30. The switched capacitor circuit of claim 29 wherein the gain limit circuitry operates based upon the magnitude of the voltage at the output node relative to the voltage at the input node.

31. The switched capacitor circuit of claim 1 wherein the drive circuitry in the second phase connects the capacitor in series between the output node and the third node, with a third current path being defined between the capacitor and the output node which has a resistance which is at least twice a resistance of a fourth current path defined between the capacitor and the third node.

32. The switched capacitor array of claim 1 further including a second capacitor having first and second terminals and wherein the plurality of transistor switches are connected to the first and second terminals of the second capacitor and wherein the drive circuitry in the first phase connects the second capacitor in series with the first capacitor between the input node and the first capacitor and wherein the drive circuitry in the second phase connects the first and second capacitors in parallel.

33. The switched capacitor array of claim 32 further including a third capacitor having first and second terminals and wherein the plurality of transistor switches are connected to the first and second terminals of the third capacitor and wherein the drive circuitry in the first phase connects the third capacitor in series with the first and second capacitors between the input node and the second capacitor and wherein the drive circuitry in the second phase connects the first, second and third capacitors in parallel.

34. A switched capacitor circuit comprising:
first and second capacitors, each having first and second terminals;
a plurality of transistor switches connected to the first and second terminals of the first and second capacitors; and
drive circuitry for controlling a state of the transistor switches, with the drive circuitry alternating between a first phase where the capacitors are connected by the switches in parallel between an input node and an output node and a second phase where the capacitors are connected in series between one of the input and output nodes and a third node, with first and second current paths being defined between the first and second capacitors, respectively, and the input node in the first phase and third and fourth current paths being defined between the first and second capacitors, respectively, and the output node in the first phase, with the first current path having a resistance selected to be at least twice a resistance of the third current path and the second current path having a resistance selected to be at least twice a resistance of the fourth current path.

35. A switched capacitor circuit comprising:
first and second capacitors, each having first and second terminals;
a plurality of transistor switches connected to the first and second terminals of the first and second capacitors; and
drive circuitry for controlling a state of the transistor switches, with the drive circuitry alternating between a first phase where the capacitors are connected by the switches in parallel between an input node and an output node and a second phase where the capacitors are connected in series between one of the input and output nodes and a third node and wherein the drive circuitry connects the capacitors to the input node and to the output node at different times when going from the second phase to the first phase, with the different time being selected so as to minimize a voltage produced on the switches.

36. The switched capacitor circuit of claim 35 wherein the drive circuitry connects the capacitors to the one of the input and output nodes and the third node at different times when going from the first phase to the second phase, with the different time being selected so as to minimize a voltage produced on the switches.

37. A switched capacitor circuit comprising:
a switched capacitor array connected between an input node and an output node and switchable between a relatively low and a relatively high gain configuration;
gain setting circuitry operable to select the gain configuration of the switched capacitor array;
a regulator operable to control the gain setting circuitry by changing the gain configuration in response to a change in load current demand, with the regulator limiting the gain configuration of the array to less than the high gain configuration in the presence of an increase in load current demand under predetermined operating conditions.

38. The switched capacitor circuit of claim 37 wherein the predetermined operating conditions include a magnitude of a voltage at the input node.

39. The switched capacitor circuit of claim 37 wherein the predetermined operating conditions include a magnitude of a voltage at the output node.

40. The switched capacitor circuit of claim 37 wherein the predetermined operating conditions include a magnitude of a voltage at the output node relative to a magnitude of a voltage at the input node.

41. The switched capacitor circuit of claim 37 wherein the switched capacitor array is switchable to an intermediate gain configuration intermediate the low and high gain configurations and wherein the regulator is further operable to limit the gain configuration to less than the intermediate gain configuration in the presence of an increase in load current demand under predetermined operating conditions.

42. The switched capacitor circuit of claim 37 wherein the switched capacitor array includes first and second capacitors, a plurality of transistor switches connected to the capacitors and drive circuitry for controlling a state of the switches, with the drive circuitry alternating between a first phase where the capacitors are connected by the switches in parallel between the input node and the output node and a second phase where the capacitors are connected in series between one of the input and output nodes and a third node.

43. The switched capacitor circuit of claim 42 wherein first and second current paths are defined between the capacitors and the input node in the first phase each having a resistance selected to be at least twice a resistance of third and fourth current paths defined between the capacitors and the output node in the first phase.

44. A switched capacitor circuit comprising:
a switched capacitor array connected between an input node and an output node and switchable to relatively low, intermediate and high gain configurations, with the array including a plurality of transistor switches formed in a common integrated circuit;
gain setting circuitry operable to select the gain configuration of the switched capacitor array;
a voltage regulator which controls an output voltage of the switched capacitor circuit; and
voltage management means for maintaining all voltages developed in the array within a voltage range.

45. The switched capacitor circuit of claim 44 wherein the transistor switches include N and P type MOS transistors, each having an associated body region, and wherein the voltage management means operates to prevent any PN junction associated with the body region from becoming forward biased.

46. The switched capacitor circuit of claim 45 wherein the P type transistors are formed in an N type well, with the voltage management means preventing a PN junction defined by the well and drain/source regions of the P type transistor from becoming forward biased and with the voltage management means preventing a PN junction defined by the substrate and drain/source regions of the P type transistor from becoming forward biased.

47. A method of controlling operation of a switched capacitor array, with the array including a capacitor having first and second terminals and a plurality of MOS transistor switches connected to the terminals of the capacitor, said method comprising the following:
switching the array to a first phase where a voltage across the capacitor is increased;
switching the array from the first phase to a second phase where the voltage across the capacitor is decreased; and
preventing any PN junction of the transistor switches defined by drain/source regions and a body in which the regions are formed from becoming forward biased when the array is in the first phase and in the second phase.

48. The method of claim 47 wherein the preventing includes setting a resistance of a first current path which includes the first terminal of the capacitor to be at least twice a resistance of a second current path which includes the second terminal of the capacitor when the first terminal is at a voltage more positive than a voltage at the second terminal.

49. The method of claim 47 wherein the preventing includes setting a resistance of a first current path which includes the first terminal of the capacitor to be at least twice a resistance of a second current path which includes the second terminal of the capacitor when the second terminal is at a voltage more positive than a voltage at the first terminal.

50. The method of claim 47 wherein the preventing includes controlling a relative time that the transistor switches are closed when switching to the first phase and a relative time that the transistor switches are closed when switching to the second phase.

51. The method of claim 50 wherein the controlling a relative time when switching the array to the first phase includes closing one of the transistor switches to connect the capacitor to a first node prior to closing one of the transistor switches to connect the capacitor to a second node.

52. The method of claim 51 wherein the switching the array from the first phase to a second phase connects the capacitor in series between the first node and a third node and wherein the controlling a relative time includes closing one of the transistor switches to connect the capacitor to the third node prior to closing one of the transistor switches to connect the capacitor to the first node.

53. The method of claim 47 wherein the capacitor is connected in series between a first node and a second node in the first phase and between the first node and a third node in the second phase and the preventing further includes switching the array to a third phase after switching the array to the first phase and prior to switching the array to the second phase, with the capacitor being connected in the third phase in series between the first node and second node and with a polarity opposite to that when the capacitor is connected between the first and second nodes in the first phase.

54. The method of claim 47 where the array is capable of being switched to a relatively low gain configuration and to a relatively high gain configuration and wherein the preventing further includes preventing the array from switching to the relatively high gain configuration under predetermined operating conditions.

55. The method of claim 54 wherein the predetermined operating conditions include at least one of a magnitude of a voltage at a first node and a magnitude of a voltage at a second node.

56. The method of claim 55 wherein the predetermined operating conditions include a magnitude of the voltage at the first node relative to the magnitude of the voltage at the second node.

57. A method of controlling a switched capacitor array, with the array including first, second and third capacitors, each having first and second terminals and a plurality of MOS transistor switches connected to the terminals of the capacitors, said method comprising:
switching the array to a first phase where the first, second and third capacitors are connected in parallel by the switches between an input node and an output node;
switching the array from the first phase to a second phase where at least one of the first, second and third capacitors is connected in series between one of the input and output nodes and a third node; and
preventing any PN junction of the transistor switches defined by drain/source regions and a body in which the drain/source regions are formed from becoming forward biased when the array is in the first phase and in the second phase.

58. The method of claim 57 wherein the preventing includes setting a resistance of first, second and third current paths defined between the first, second and third capacitors, respectively, to be at least twice resistances of fourth, fifth and sixth current paths defined between the first, second and third capacitors, respectively, and the output node when the array is in the first phase.

59. The method of claim 58 wherein the at least one capacitor is connected to the output node in the second phase and the preventing further includes setting a resistance of a seventh current path between the at least one capacitor and the output node to be at least twice a resistance of an eighth current path defined between the at least one capacitor and the third node.

60. The method of claim 57 where the preventing includes controlling a relative time that the transistor switches are closed when switching to the first phase and a relative time that the switches are closed when switching to the second phase.

61. The method of claim 60 wherein the controlling a relative time when switching to the first phase includes closing the switches which connect the first, second and third capacitors to the output node prior to closing the switches which connect the first, second and third capacitors to the input node.

62. The method of claim 61 wherein the switching the array from the first phase to the second phase connects the at least one capacitor to third node and wherein the controlling a relative time includes closing the switch that connects the at least one capacitor to the third node prior to closing the switch that connects the at least one capacitor to the output node.

63. The method of claim 57 wherein the at least one capacitor is connected between the input node and the third node in the second phase and the preventing further includes switching the array to a third phase after switching the array to the first phase and prior to switching the array to the second phase, with the at least one capacitor connected between the input node and the third node in the second phase being connected in the third phase in series between the input node and the output node and with a polarity opposite to that when the at least one capacitor was connected between the input node and the output node in the first phase.

64. The method of claim 57 wherein the array is capable of being switched to a relatively low gain configuration and to a relatively high gain configuration in response to an increase in load current demand and wherein the preventing includes the step of preventing the array from switching from the low gain configuration to the high gain configuration in the presence of an increase in load current demand in response to predetermined switched capacitor array conditions.

65. A switched capacitor circuit comprising:
a first capacitor having first and second terminals;
a plurality of transistor switches connected to the first and second terminals of the first capacitor; and
drive circuitry for controlling a state of the transistor switches, with the drive circuitry alternating between a first phase where the capacitor is connected by the switches in series between an input node and an output node and a second phase where the capacitor is connected in series between one of the input and output nodes and a third node, with the relative timing of the transistor switch closures for entry into the first phase and relative timing of the transistor switch closures for entry into the second phase being controlled so as to reduce a magnitude of the voltages produced at terminals of the transistor switches.

66. The switched capacitor circuit of claim 65 wherein, upon entry into the first phase from the second phase, one of the transistor switches connecting the capacitor to the output node is closed prior to closure of one of the transistor switches connecting the capacitor to the input node.

67. The switched capacitor circuit of claim 66 wherein, upon entry into the second phase, one of the transistor switches connecting the capacitor to the third node is closed prior to closure of one of the transistors connecting the capacitor to the input node.

68. The switched capacitor circuit of claim 65 wherein, upon entry into the second phase, one of the transistor switches connecting the capacitor to the third node is closed prior to closure of one of the transistors connecting the capacitor to the output node.

69. The switched capacitor circuit of claim 68 wherein, upon entry into the first phase from the second phase, one of the transistor switches connecting the capacitor to the output node is closed prior to closure of one of the transistor switches connecting the capacitor to the input node.

70. A switched capacitor circuit comprising:
at least one capacitor;
a plurality of transistor switches connected to the at least one capacitor;
a voltage regulator which limits a maximum voltage at an output node; and
drive circuitry for controlling a state of the transistor switches, with the drive circuitry alternating between a first phase where the at least one capacitor is connected by at least first and second ones of the switches in a first configuration, and a second phase where the at least one capacitor is connected in a second configuration, different than the first configuration, and wherein the drive circuitry includes timing control circuitry which causes at least the first switch to start to close after the second switch has completed closing upon entry into the first phase.

71. A switched capacitor circuit comprising:
a first capacitor having first and second terminals;
a plurality of transistor switches connected to the first and second terminals of the first capacitor;
a voltage regulator which limits a maximum voltage at an output node; and
drive circuitry for controlling a state of the transistor switches, with the drive circuitry alternating between a first phase where the capacitor is connected by the switches in series between an input node and the output node, with the first terminal of the capacitor being connected facing the input node and the second terminal of the capacitor being connected facing the output node, and a second phase where the capacitor is connected in series between the output node and a third node, with the first terminal of the capacitor facing the third node and the second terminal of the capacitor facing the output node and wherein the drive circuitry includes timing control circuitry which forces the second terminal to be connected before the first terminal upon entry into the first phase.

72. The circuit of claim 71 wherein the timing control circuitry, upon entry into the first phase, begins to turn on one of the transistor switches which connects the second terminal to the output node after one of the transistor switches that connects the first terminal to the input node has completely turned on.

73. A switched capacitor circuit comprising:
a first capacitor having first and second terminals;
a plurality of transistor switches connected to the first and second terminals of the first capacitor; and
drive circuitry for controlling a state of the transistor switches, with the drive circuitry switching from a first, to a second, and then to a third phase and then back to the first phase, with the first phase having the first capacitor connected by the switches between an input node and an output node with the first terminal facing the output node, with the second phase having the first capacitor connected between the input node and the output node with the first terminal facing the input node and with the third phase having the first capacitor connected between the input node and a third node with the first terminal facing the input node.

74. The circuit of claim 73 further including a second capacitor having first and second terminals and where, in the first phase, the drive circuitry connects the second capacitor in parallel with the first capacitor with the first terminal of the second capacitor facing the output node and where, in the third phase, connects the second capacitor in series with the first capacitor with the first terminal of the second capacitor facing the input node.

75. A switched capacitor circuit comprising:

a capacitor array having at least one capacitor;

a plurality of transistor switches connected to the at least on capacitor;

drive circuitry for controlling a state of the transistor switches so that the array will switch from a first phase to a second phase, from the second phase to a third phase and from the third phase to the first phase, with the second phase altering a voltage across the capacitor so as to reduce a magnitude of voltages produced on the transistor switches when the array is switched to the third phase.

76. The switched capacitor circuit of claim 75 where the array includes first and second capacitors each having first and second terminals and where in the first phase the first and second capacitors are connected in parallel between an input node and an output node of the array with the first terminals of the capacitors facing the output node, where in the second array phase the first and second capacitors are connected in parallel between the output node and a third node of the array with the first terminals facing the output node and where in third phase, the first and second capacitors are connected in series between the output node and the third node with the first terminals facing the output node.

77. The switched capacitor circuit of claim 75 where in the first phase the capacitor is connected in series between an input and an output node of the array with the first terminal facing the output node, where in the second phase, the capacitor is connected in series between the input and output nodes with the first terminal facing the input node and where in the third phase the capacitor is connected in series between the output node and a third array node with the first terminal facing the output node.

\* \* \* \* \*